US012748215B2

(12) United States Patent
Lareau

(10) Patent No.: US 12,748,215 B2
(45) Date of Patent: Sep. 29, 2026

(54) METHODS AND SYSTEMS FOR TRACKING WILDFIRES USING WEATHER RADAR DATA

(71) Applicant: Board of Regents of the Nevada System of Higher Education, on behalf of the University of Nevada, Reno, Reno, NV (US)

(72) Inventor: Neil P. Lareau, Reno, NV (US)

( * ) Notice: Subject to any disclaimer, the term of this patent is extended or adjusted under 35 U.S.C. 154(b) by 514 days.

(21) Appl. No.: 18/318,845

(22) Filed: May 17, 2023

(65) Prior Publication Data

US 2023/0375716 A1 Nov. 23, 2023

Related U.S. Application Data

(60) Provisional application No. 63/342,671, filed on May 17, 2022.

(51) Int. Cl.
*G01S 17/95* (2006.01)

(52) U.S. Cl.
CPC .................................... *G01S 17/95* (2013.01)

(58) Field of Classification Search
CPC .......... G01S 17/95; G01S 7/003; G01S 7/411; G01S 13/951; G01S 13/953; G01S 13/955
See application file for complete search history.

(56) References Cited

U.S. PATENT DOCUMENTS

2012/0303278 A1* 11/2012 Dannevik ............... G01W 1/00 702/3
2020/0082612 A1* 3/2020 Frederick ........... G01C 21/3837
2020/0305258 A1* 9/2020 Zhao .................... G06V 40/103
2023/0199460 A1* 6/2023 Primo .................. H04W 4/021 455/404.2
2023/0222667 A1* 7/2023 Abdollahian Noghabi ................ G06T 7/174 382/155

OTHER PUBLICATIONS

N. McCarthy et al., "Wildfire and weather radar: A review", Journal of Geophysical Research: Atmospheres, 124, pp. 266-286, 2018.*
Matthew P. Thompson et al., "A polygon-based modeling approach to assess exposure of resources and assets to wildfire", Nat Hazards (2013) 67: 627-644.*
Konstantin Krivoruchko et al., "Multivariate Areal Interpolation for Continuous and Count Data", Procedia Environmental Sciences 3, pp. 14-19, 2011.*

* cited by examiner

*Primary Examiner* — Alexander Satanovsky

(57) ABSTRACT

Methods, systems and apparatus for providing timely and accurate estimates of the location and rate-of-spread of a wildfire. In some embodiments, a processor of a user device receives user defined polygon data estimating a perimeter of a wildfire and generates ellipse data fitting the polygon data. The processor also receives radar reflectivity data via a communication device from at least one weather radar, then determines, based on the radar reflectivity data and the ellipse data, local maxima data and a plurality of fire points, and then generates, based on the plurality of fire points, an updated estimate of the perimeter of the wildfire. In some implementations, the processor of the user device may also transmit the updated estimate of the perimeter of the wildfire to a wildfire update website.

20 Claims, 11 Drawing Sheets

100

150

1000

1020

METHODS AND SYSTEMS FOR TRACKING WILDFIRES USING WEATHER RADAR DATA

CROSS-REFERENCE TO RELATED APPLICATION

This U.S. patent application claims priority to U.S. Provisional Patent Application No. 63/342,671 filed on May 17, 2022, the entire contents of which are incorporated herein by reference for all purposes.

This invention was made with government support under Contract No. CMMI1953333 awarded by the National Science Foundation. The government has certain rights in the invention.

FIELD OF THE INVENTION

Methods and systems for utilizing weather radars data to provide timely and accurate updates concerning the location and rate-of-spread of wildfires. Specifically, a radar-based fire-perimeter tracking tool leverages the tendency for local maxima in the radar reflectivity of weather radars to be collocated with active fire perimeters to generate and provide wildfire information updates. In an embodiment, reflectivity maxima are located using search radials from points inside a fire polygon, and perimeters are then updated at the return interval of the radar (for example, in some embodiments the perimeters are updated at intervals of about ten minutes).

BACKGROUND

Presently, satellite and airborne Infrared (IR) remote sensing provide the backbone for operational fire tracking by quantifying the fire perimeters, fire radiative power (FRP), fire-size, and fire temperature. These data are available from both polar orbiting satellites and geostationary satellites. The polar orbiters (e.g., Moderate resolution Imaging Spectrometer (MODIS) and Visible Infrared Imaging Radiometer Suite (VIIRS)) provide high spatial resolution fire detections (1 km for MODIS and 375 m for VIIRS), but only four times daily.

Although such fire detections provide important snapshots of fire activity, they are insufficient for tracking fire progression in real time. Filling this temporal data gap are GOES-16 and GOES-17 geostationary satellites which provide greater time resolution (0.5 to 5 min), albeit at much lower spatial resolution (e.g., 2 km pixels). Data from these geostationary satellites can be used to provide early alerts for new fire ignitions and to quantify changes in fire intensity. However, they lack the spatial resolution required to provide sufficient detail on wildfire perimeter location for most now-casting needs to answer such questions as: "When will the fire impact our neighborhood?"

Although some satellite IR sensing systems can provide very high spatial-resolution, for example 30-m pixels with LANDSAT8 (L8), they have a very low return interval (such as 8 days) which is inadequate for tracking sub-daily fire changes. In addition to temporal and spatial limitations, errors in satellite-based fire detection and perimeter monitoring can result from parallax and "hot plume detections" due to super-heated gases and embers that are lofted in plumes. Other sources that can cause false detection or missed detections also exist such as sun glint and pixel saturation.

In contrast to satellites, aircraft IR provides very high special resolution (~10 m) fire perimeters. In the United States, once-daily nighttime fire perimeters are collected as part of the National Infrared Operations (NIROPS). While these data are crucial for operations and fire management their once-daily interval precludes their use for now-casting purposes. Likewise, while autonomous aircraft (i.e., drones) provide promising new approaches for fire-tracking, they are only sporadically available and do not yet provide a viable nowcasting option.

Whereas IR sensors measure fire processes directly, weather radars quantify the temporal and spatial evolution of "pyrometeors" (i.e., ash and debris) lofted into the atmosphere by the fire. Thus, radars indirectly measure changes in the fire intensity and location. This capability relies on the radar's sensitivity to pyrometeors suspended in wildfire convective plumes such that the radar reflectivity, Doppler velocity, and dual polarization data quantify plume structure, air flow, and plume composition, respectively.

While radar scattering by pyrometeors remains a topic of ongoing research, in general the larger the radar reflectivity the larger the pyrometeor size and/or number concentration. Accordingly, reflectivity data can quantify variations in fire and plume processes, including changes in plume behavior, volume, and vertical extent. These data can also be linked to changes in underlying fire properties. For example, it has been shown that a fire's growth rate can be tracked by using changes in the volume of radar observed ash plumes. In addition, it has been demonstrated that horizontal radar scans can track changes in fire perimeters, which are apparent as local maxima in the radar reflectivity.

Currently, the ability to warn people concerning the impacts of large wildfires lags behind that of other weather-based disasters. For example, the accuracy of short-lead-time radar and satellite-based warnings for severe thunderstorms (i.e., nowcasting) is very good, in stark contrast to the uncertainty surrounding proving information of the location and spread of wildfires. To be specific, no systematic mapping of wildfires meets nowcasting needs, with most infrared (IR) fire-observations suffering from either a lack of spatial (e.g., GOES16/17 data at 2 km pixels) or temporal resolution (e.g., IR flights once daily, polar orbiting satellites four times daily). This data gap was tragically underscored during California's Camp Fire in 2018 wherein details of fire location and spread were largely unavailable to the public, confounding evacuation decisions with deadly consequences.

With this data gap in mind, the inventors recognized that there is a need for methods to provide timely and accurate updates concerning the location and rate-of-spread of wildfires. Accordingly, disclosed herein are processes and systems which utilize weather radars (which may include fixed location radars and/or mobile radars, such as radars deployed on vehicles) to track fire progression at high spatial and temporal resolution (e.g., hundreds (100s) of meters, tens (10s) of minutes) such that timely and accurate information concerning the location of wildfire perimeters along with the direction and rate of spread in near real-time can be provided. Specifically, end users need to be able to accurately answer the questions: "Where is the fire now?" and approximate "Where will the fire be in the next hour?" Thus, in embodiments disclosed herein it is demonstrated how radar reflectivity can be used to track fire progression. Specifically, the wildfire data provided by the disclosed methods and systems can be beneficially utilized to inform critical firefighting decisions, evacuation decisions and fire management tactics for firefighting agencies (for example, the U.S. Forest Service (USFS), Bureau of Land Management (BLM), CalFire and the like) and Emergency Managers, and used to inform the public at large who may be in harm's way.

SUMMARY OF THE INVENTION

Presented are methods, systems and apparatus for providing timely and accurate estimates of the location and rate-of-spread of a wildfire. In some embodiments, a suitable user device includes a processor that is operably connected to an input device, an output device, a communication device and a storage device. In some implementations, the processor receives, via the input device, user defined polygon data estimating a perimeter of a wildfire and then generates ellipse data fitting the polygon data. The processor also receives, via the communication device from at least one weather radar, radar reflectivity data; next determines, based on the radar reflectivity data and the ellipse data, local maxima data and a plurality of fire points; and then generates, based on the plurality of fire points, an updated estimate of the perimeter of the wildfire. In some embodiments, the processor may transmit, via the communication device, the updated estimate of the perimeter of the wildfire to a wildfire update website.

In some embodiments, after generating the ellipse data the processor may identify, based on the ellipse data, a center point, a quarter-point and a three-quarter point of a major axis of an ellipse defined by the ellipse data. The processor may also then determine the local maxima data by searching radially outwardly from the center point, the quarter-point and the three-quarter point of the major axis of the ellipse within the reflectivity data.

In some implementations, generating the updated estimate of the perimeter of the wildfire may include the processor adding the plurality of fire points data to a wildfire point cloud representing the wildfire and then fitting a polygon to the updated wildfire point cloud. In some embodiments, the process may also include, before receiving the user defined polygon data, displaying a wildfire graphical user interface (GUI) on a touch screen (an input device) so that the user can provide the user defined polygon data. Also, in some implementations the weather radar may include one or more fixed weather radar and/or one or more mobile weather radar.

Some embodiments according to the disclosure include a user device for providing timely and accurate estimates of the location and rate-of-spread of a wildfire. A suitable user device includes a processor, an input device operably connected to the processor, an output device operably connected to the processor, a communication device operably connected to the processor, and a storage device operably connected to the processor. Examples of suitable user devices include, but are not limited to, mobile devices such as a cellphone, a smartphone, a tablet computer and/or a laptop computer.

The storage device of the user device stores processor executable instructions which when executed cause the processor to receive, via the input device, user defined polygon data estimating a perimeter of a wildfire; generate ellipse data fitting the polygon data; receive, via the communication device, radar reflectivity data from at least one weather radar; determine, based on the radar reflectivity data and the ellipse data, local maxima data and a plurality of fire points; and generate an updated estimate of the perimeter of the wildfire based on the plurality of fire points. The storage device may also store further processor executable instructions which when executed causes the processor to transmit the updated estimate of the perimeter of the wildfire to a wildfire update website.

In some implementations, the storage device may store further processor executable instructions, after the processor executable instructions for generating the ellipse data, which when executed cause the processor to identify, based on the ellipse data, a center point, a quarter-point and a three-quarter point of a major axis of an ellipse defined by the ellipse data. The storage device may then also store further processor executable instructions which when executed cause the processor to determine the local maxima data by searching radially outwardly from the center point, the quarter-point and the three-quarter point of the major axis of the ellipse within the reflectivity data.

In some embodiments, the processor executable instructions for generating an updated estimate of the perimeter of the wildfire comprise instructions which when executed cause the processor to add the plurality of fire points data to a wildfire point cloud representing the wildfire, and then fit a polygon to the updated wildfire point cloud to generate the updated estimate of the perimeter of the wildfire. The storage device may further store further processor executable instructions, prior to the instructions for receiving the user defined polygon data, which when executed cause the processor to display, on a touchscreen, a wildfire graphical user interface (GUI). The wildfire GUI provides a convenient interface for the user to fit a polygon to a current estimate of the wildfire and provide that data to the computer processor.

Another embodiment in accordance with the disclosure is a system for providing timely and accurate estimates of the location and rate-of-spread of a wildfire. Such a system may include at least one weather radar, a user device operably connected to the at least one weather radar, and a wildfire update website server operably connected to the user device. In disclosed embodiments, the user device includes a processor operably connected to an input device, an output device, a communication device and a storage device. In some embodiments, the storage device stores processor executable instructions which when executed cause the processor to receive, via the input device, user defined polygon data estimating a perimeter of a wildfire; generate ellipse data fitting the polygon data, receive, via the communication device, radar reflectivity data from at least one weather radar; determine, based on the radar reflectivity data and the ellipse data, local maxima data and a plurality of fire points; and generate an updated estimate of the perimeter of the wildfire based on the plurality of fire points. The storage device of the user device may also store further processor executable instructions which when executed causes the processor to transmit the updated estimate of the perimeter of the wildfire to the wildfire update website.

In some implementations, the system may also include a network operably connected to and/or between one or more weather radar, the user device and the wildfire update website server. In addition, the storage device of the user device may store further processor executable instructions which when executed, after the processor executable instructions for generating the ellipse data, cause the processor to identify, based on the ellipse data, a center point, a quarter-point and a three-quarter point of a major axis of an ellipse defined by the ellipse data. The storage device may then also store further processor executable instructions which when executed cause the processor to determine the local maxima data by searching radially outwardly from the center point, the quarter-point and the three-quarter point of the major axis of the ellipse within the reflectivity data.

In some embodiments of the system, the processor executable instructions for generating an updated estimate of the perimeter of the wildfire include instructions which when executed cause the processor of the user device to add the plurality of fire points data to a wildfire point cloud representing the wildfire and fit a polygon to the updated wildfire point cloud to generate the updated estimate of the perimeter of the wildfire. The storage device of the user device may also store further processor executable instructions, which when executed prior to the instructions for receiving the user defined polygon data, cause the processor to display, on a touchscreen of the user device, a wildfire graphical user interface (GUI). In addition, some embodiments of the system include one or more fixed weather radar and/or one or more mobile weather radar.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DETAILED DESCRIPTION

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of the embodiments may be practiced without some or all of the specific details. In other instances, well-known process operations have not been described in detail in order not to unnecessarily obscure novel aspects.

In general, and for the purposes of introducing concepts of embodiments of the present disclosure, disclosed herein are methods and systems that utilize weather radar data to quantify changes in wildfires and to provide timely estimates and/or updates of wildfire progression that can be used by government authorities, firefighters and the general public to make firefighting and/or evacuation decisions and the like. Using weather radar data to provide such wildfire updates is advantageous because the weather radar data are available at more frequent intervals and at finer resolution than existing data for tracking wildfires.

The novel process disclosed herein was tested using publicly available NEXRAD radar data for two large and destructive wildfires, the Camp Fire and the Bear Fire, both of which occurred in northern California of the United States. The radar-based fire-perimeters are compared herein with available, albeit limited, satellite and airborne infrared observations, and as explained below show good agreement with conventional fire tracking tools. In addition, the radar data provide insights into fire rate of spread, revealing the importance of long-range spotting in generating rate-of-spread information that exceeds conventional estimates.

Figure 1A:
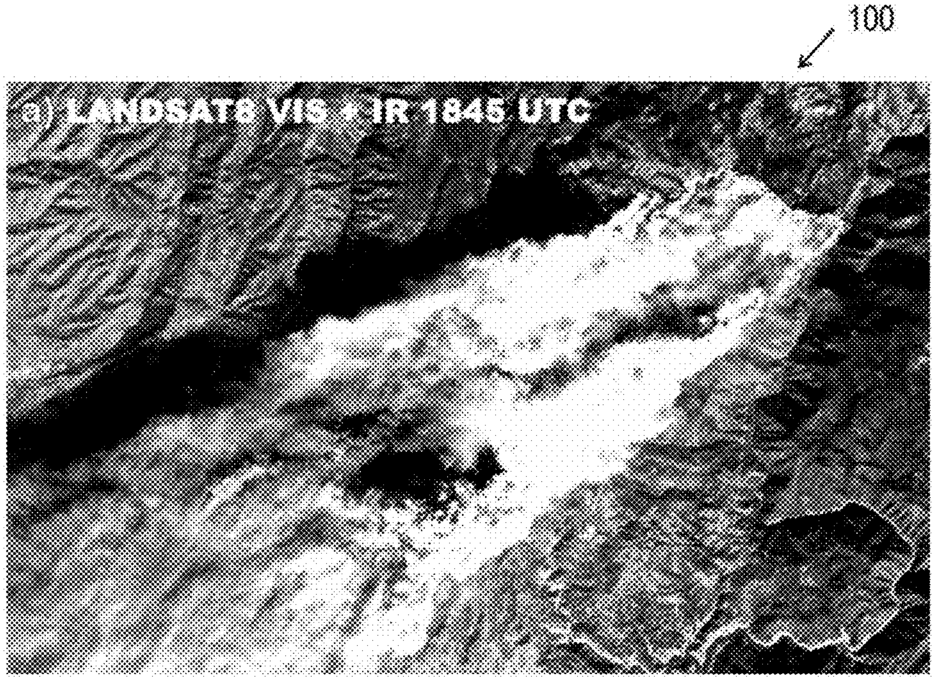
FIG. 1A shows fortuitously timed LANDSAT8 (L8) image of the visible and infrared satellite observations of the Camp Fire which impacted Paradise, California on Nov. 8, 2018.
Figure 1B:
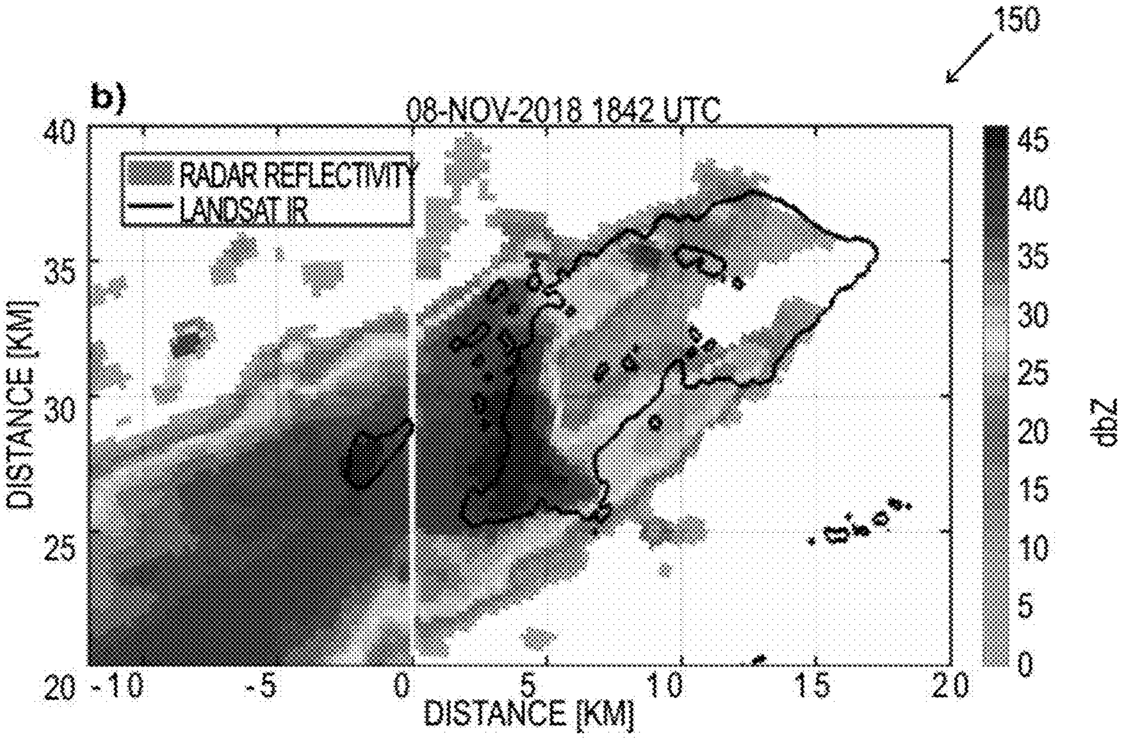
FIG. 1B shows contemporaneous Next Generation Weather Radar (NEXRAD) radar reflectivity of the Camp Fire.

FIG. 1A shows fortuitously timed LANDSAT8 (hereinafter "L8") image of the visible and infrared satellite observations, and FIG. 1B shows contemporaneous Next Generation Weather Radar (NEXRAD) radar reflectivity, of the Camp Fire which impacted Paradise, California on Nov. 8, 2018. FIGS. 1A and 1B demonstrate some key attributes of the radar data used to devise the radar-based perimeter tracking implementations disclosed herein. Specifically, it was recognized that local maxima in radar reflectivity closely correspond to active fire perimeters and therefore, based on this inference, disclosed is a method for tracking the wildfire's progression using radar reflectivity.

During development of the novel processes disclosed herein, data from a NEXRAD radar at Beale Air Force Base in California (KBBX) were used to quantify wildfire plume processes during the Camp Fire and the Bear Fire. Specifically, the Camp Fire was observed on Nov. 8, 2018 and the Bear Fire was observed on Sep. 8, 2020 and data was collected. The metadata of the KBBX radar and scan parameters are as follows: Latitude/Longitude of 39.4961-121.6317; Base elevation of 53 MSL; VCP of 32, 215; Azimuthal resolution of 0.5° and beam width of 0.9°; a Range resolution of 250 meters (m); an approximate distance to the Camp Fire center of 30 kilometers (km), and to the Bear Fire center of 45 km; and a minimum/maximum azimuthal resolution for the Camp Fire of 175/349 m and for the Bear Fire of 175/523 m.

NEXRAD radars use a 10-cm wavelength that is sensitive to pyrometeors, and observations suggest that the radar reflectivity is largest immediately above the fire perimeter, where the lofted ash and debris are most concentrated. In addition, downstream reflectivity decays are due to dilution by clear ambient air and the fall out of pyrometeors. As such, local maxima in radar reflectivity proximal to the fire provide an estimate for the fire's location, as shown in FIG. 1B.

Radar beam blockage by topography can impede observing fires in complex terrain, and thus beam blockage was estimated using standard beam refraction and a high-resolution Digital Elevation Model (DEM). Specifically, a 2-D Gaussian distribution of beam illumination was used along with the 30-m spatial resolution topographic data set from Shuttle Radar Tomography Mission (STRM) to estimate the beam power lost along each radar radial.

Figure 2A:
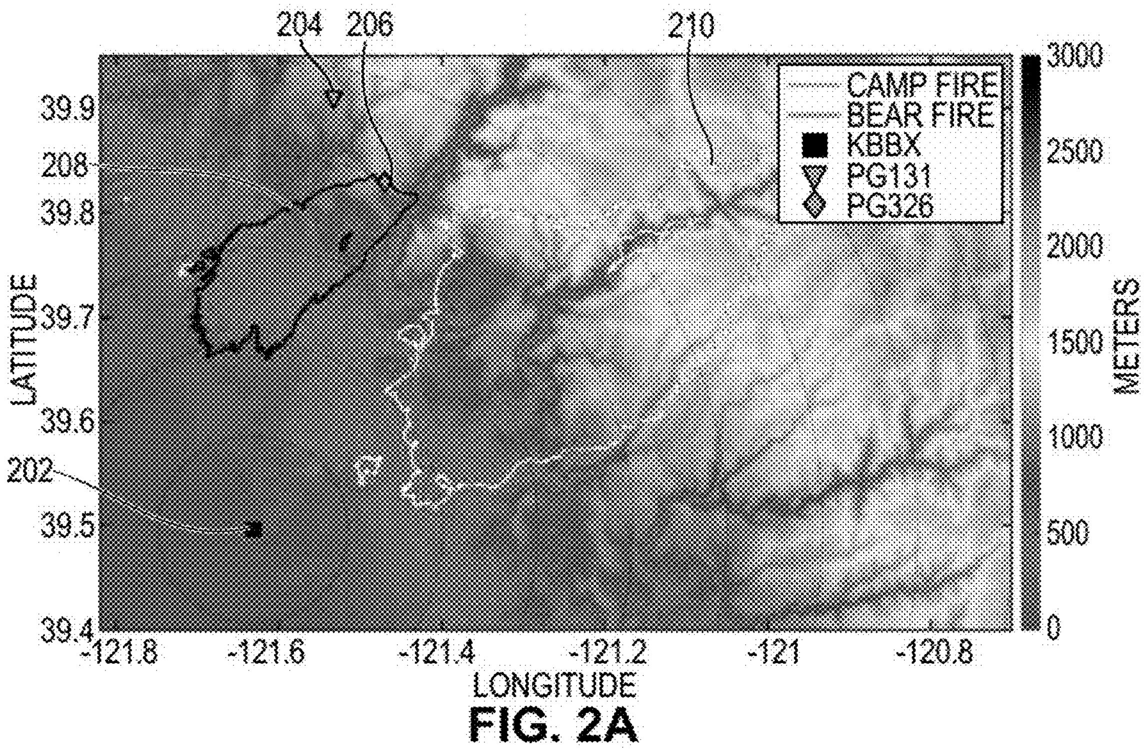
FIGS. 2A to 2E illustrate maps of the beam blockage and power loss, in decibels, for the nominal 0.5° and 1.5° beam elevations along with the Bear Fire and Camp Fire perimeters and terrain data.

FIGS. 2A to 2E illustrate maps of the beam blockage and power loss, in decibels, for the nominal 0.5° and 1.5° beam elevations along with the Bear fire and Camp fire perimeters and terrain data. Specifically, FIG. 2A is an overview 200 of the KBBX radar site (light square) 202, the terrain (shaded areas), station locations (yellow markers) 204 and 206, and a first fire-perimeter 208 of the Bear fire and a second fire perimeter 210 of the Camp fire.

Figure 2B:
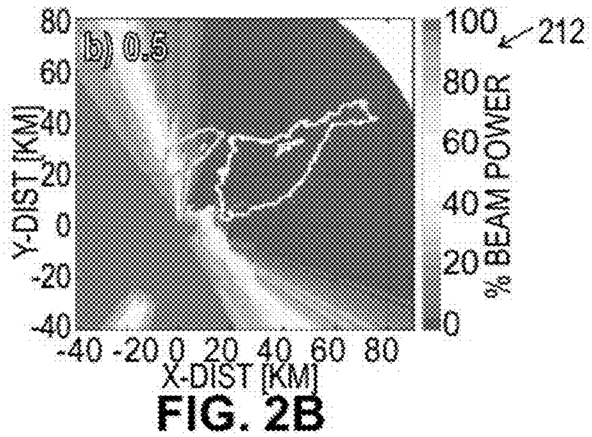
Figure 2D:
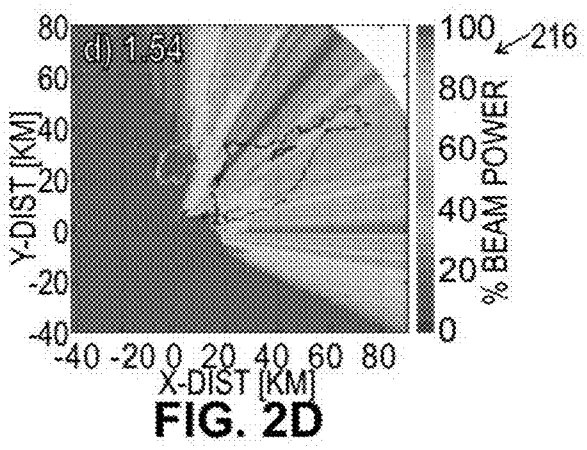
Figure 2C:
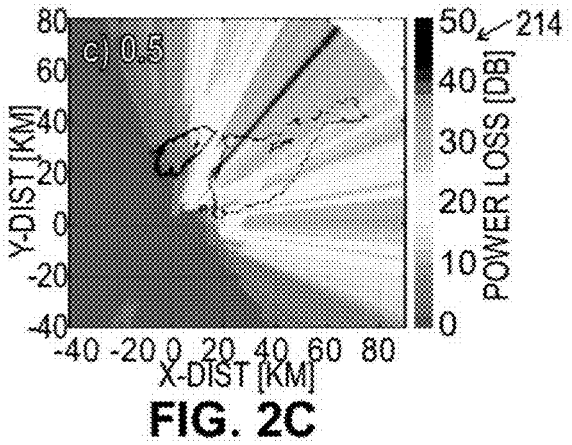
Figure 2E:
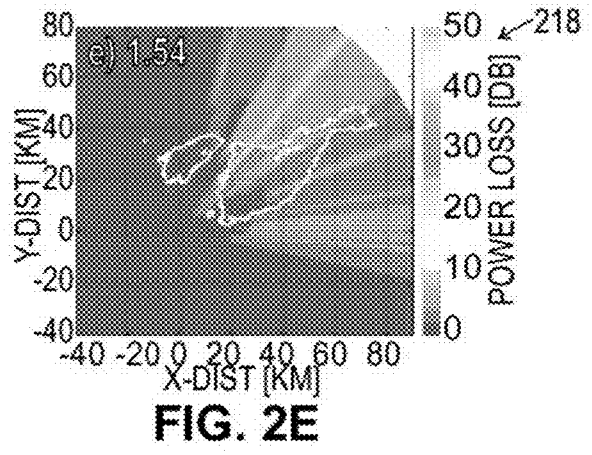

FIGS. 2B and 2C illustrate the fraction of beam power 212 and the power loss 214 in decibels (db), respectively, for the 0.5 deg scan from KBBX 202. FIGS. 2D and 2E illustrate the fraction of beam power 216 and the power loss (in decibels) 218 for the 1.5 deg scan from KBBX 202. The estimates show severe beam blockage (~100% loss) over the fire areas for the 0.5° scan (FIGS. 2B and 2C), which precludes the use of these data. In contrast, the beam blockage over the fire areas for the 1.5° beam blockage over the Camp Fire (FIGS. 2D and 2E) was minimal, and that over the Bear Fire, the beam blockage was 40-60%, with a power loss of up to 10 dB. Despite this partial beam blockage, high radar reflectivity with structure clearly linked to the fire is resolved in this "ground skimming" scan. In other words, the remaining 50% of the beam is filled with high concentrations of pyrometeors linked closely to the surface combustion. As such, these 1.5° data are well suited for tracking the fire progression and serve as the basis for the tracking process utilized for both fires. In other realizations (on a site-by-site and fire-by-fire basis) a similar analysis of beam blockage would be required.

Radar data was acquired from the National Oceanographic and Atmospheric Administration (NOAA's) big-data project hosted on the Amazon™ cloud and preprocessed for use in the fire perimeter tracking. Preprocessing helps establish robust features in the data and eliminates noise and spurious radar features. In the Volume Coverage Patterns (VCPs) used in the study, the radar conducted two successive sweeps at each elevation angle, but with different pulse repetition frequencies (PRFs). The first "reflectivity" sweep used a larger PRF, yielding a longer unambiguous range whereas the second sweep used a smaller PRF, yielding a larger Nyquist velocity, but a shorter unambiguous range. This second sweep, while focused on velocity observations, also provides reflectivity data. These sweeps were typically about one minute (1 min) apart in time. To best capture the structure of the fire in each volume scan, the maximum reflectivity at each range (r) and azimuth (θ) point between these two sweeps for the 1.5° beam can be modeled as:

$$dbZ(r,\theta)=\max(dbZ_1(r,\theta),dbZ_2(r,\theta))$$

This "maximum" approach is used to provide a richer characterization of the fire front within the interval covered by the two successive sweeps without running the process separately for each time (i.e., one-minute updating is not needed). It should be noted that using just the first "reflectivity" sweep ultimately provides sufficiently similar results.

Next, noise is filtered out from the data using two steps. First, a binary image mask was used to remove small groupings of isolated pixels from the dataset. Second, a five by five (5×5) point median filter was applied to reduce noise in the remaining data, yielding a smoothed reflectivity data set ($dbZ_{sm}$) from the fire perimeters were tracked.

Figure 3A:
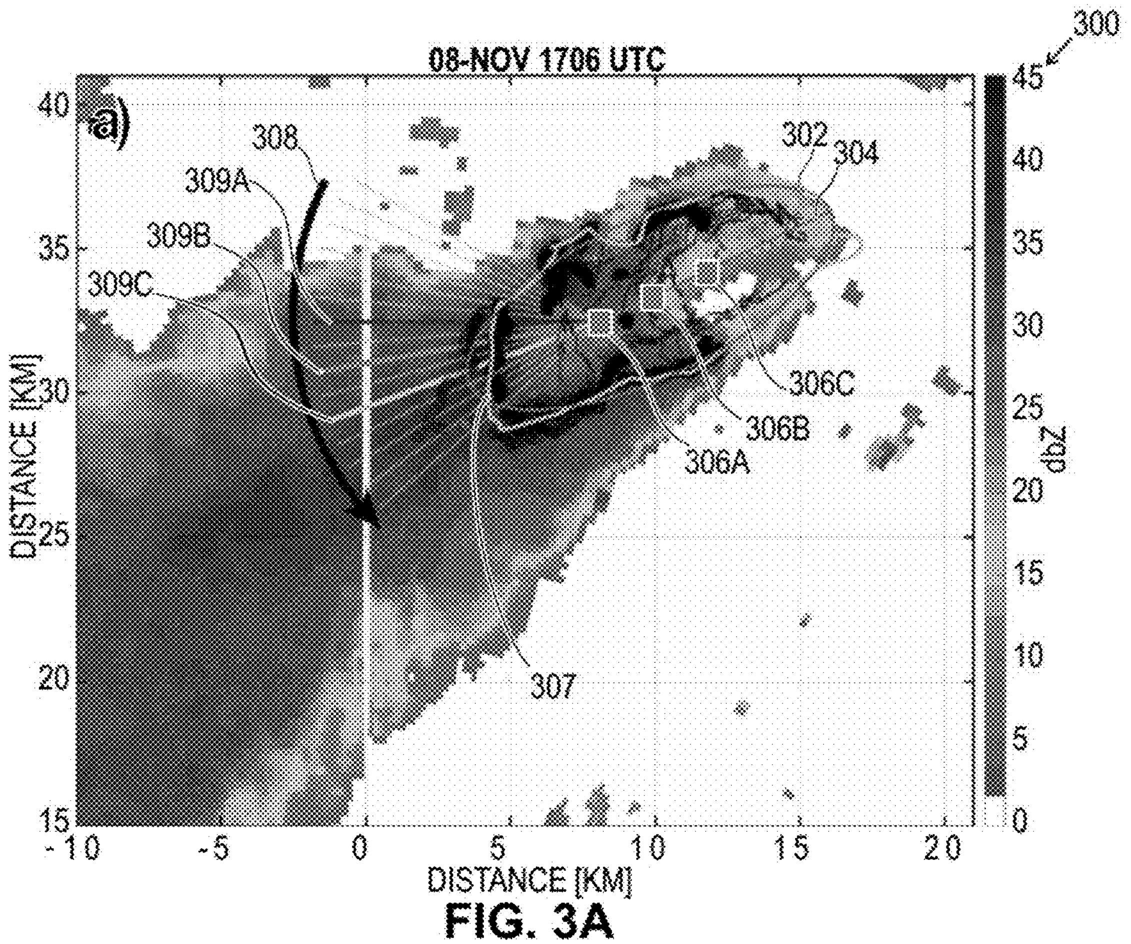
FIGS. 3A, 3B, 3C and 3D depict graphs of wildfire data obtained using the radar perimeter tracking process for the Camp fire at 1706 UTC on Nov. 8, 2018.

FIGS. 3A, 3B, 3C and 3D depict graphs of wildfire data obtained using the radar perimeter tracking process for the Camp Fire at 1706 UTC on 8 Nov. 2018 in accordance with some embodiments. Specifically, FIG. 3A is a graph 300 illustrating the Radar reflectivity (shaded areas) with a fire-ellipse 302 having a major axis 304, search centers 306A, 306B and 306C (squares), and search radials (shown every 5 deg radiating outwards from the search center 306A along the arrow 308), including selected radials 309A, 309B and 309C. Small black dots indicate fire points from previous time steps of the tracking algorithm, while the large black squares indicate local maxima along search radials at this time (i.e., the current active fire points). The open black circles indicate the "back edge" of the combustion zone (see text below).

Figure 3B:
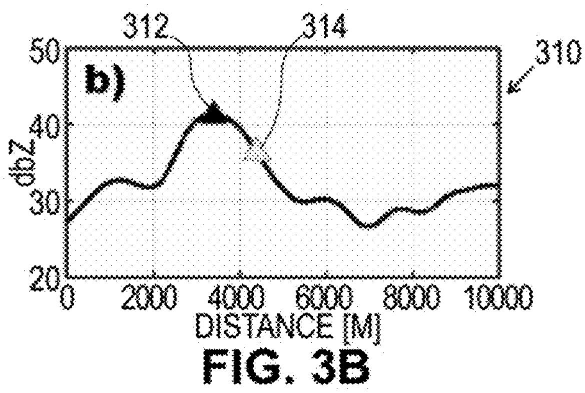
Figure 3C:
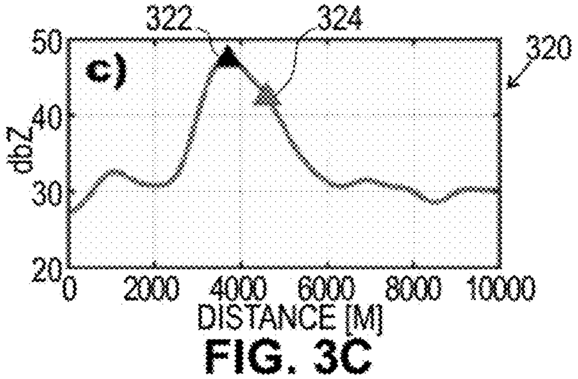
Figure 3D:
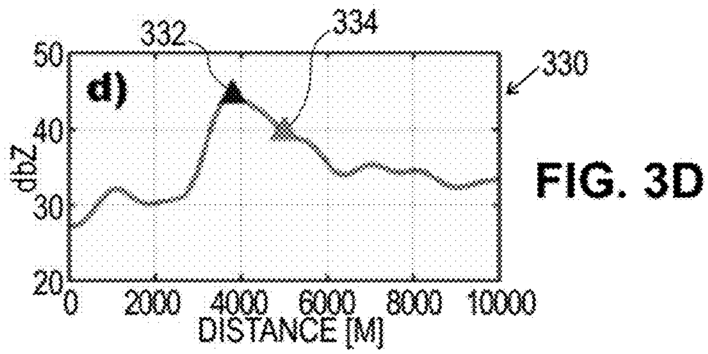

The graphs 310, 320 and 330 of FIGS. 3B, 3C and 3D, respectively, identify local reflectivity maxima 312, 322 and 332 that correspond to the dark squares in FIG. 3A along the search radials 309A, 309B and 309C. FIGS. 3B, 3C and 3D also identify local reflectivity maxima 314, 324 and 334 of the leading edge of the fire front.

In some embodiments, a fire-perimeter algorithm extracts the two-dimensional (2D) $dbZ_{sm}$ array for each time-step then locates local reflectivity maxima linked to the fire perimeter by searching radially outward from points selected within an ellipse approximating the fire's shape. In an implementation, the code for the algorithm was developed in MATLAB (MATLAB 2018), and a graph 300 of the algorithm's performance during the Camp Fire is shown in FIGS. 3A-3D. In an implementation, the conceptual steps are as follows:

Step 1: For the first timestep the user defines a starting polygon approximating the fire perimeter ($x_{perim}$, $y_{perim}$) using a point-and-click graphical user interface. This enables the user to leverage knowledge about the initial location of the fire. In some other implementations other sources, such as aircraft IR (infra-red) data, could provide a first perimeter estimate.

Step 2: An ellipse is fit to the initial polygon (See the oval in 302 in FIG. 3A). Ellipses are useful for approximating the general shape of a fire, and in this case are only used to compute the primary growth axis (i.e., the major axis 304) of the more complex fire-polygon. In some implementations, the ellipse fitting uses a least squares criterion based on a conic ellipse and the input vertices of the fire polygon. Because the ellipse's major axis 304 can extend beyond the fire's perimeter, the major axis was trimmed to only include points within the actual fire polygon 302. Thus, the major axis 304 extends slightly beyond the edges of the fire perimeter depicted as line 307. Next, the center point 306B, one-quarter point 306C, and three-quarter point 306A of the major axis 304 are identified. These three points are then used for a radial search for fire perimeter points described in the next (Step 3). These three points, rather than one, are used to better capture growth along any flank of the wildfire and to create a better sampling of the perimeter.

Step 3: From the three search points 306A, 306B and 306C along the major axis 304 a search was conducted radially outward for local maxima in radar reflectivity. This was accomplished by generating search radial vectors using 0.5° azimuthal steps around a three hundred and sixty degree (360°) arc and by interpolating the underlying radar data to the search vector (See example search radials 309A, 309B and 309C drawn in FIG. 3A). Each search vector extends from the search point within the polygon to a location 10 km beyond the edge of the previous fire-perimeter. A 10 km cutoff was used as it falls at the upper end of long-range spotting reported for most, but not all, wildfires.

In some implementations, the interpolation may be accomplished using a scattered interpolant that is available at the "mathworks" website (https://www.mathworks-.comfhelp/matlab/ref/triscatteredinterp.html) generated from the two-dimensional (2D) reflectivity array ($dbZ_{sm}$) along with the x- and y-coordinates of each data point. The interpolation is linear, uses Delaunay triangulation, and produces a surface (V), wherein:

$$V=F(x,y,dbZ_{sm})$$

which can be evaluated to yield the reflectivity value ($dbZ_{int}$) at the points along the search vector ($x_s$, $y_s$) as follows:

$$dbZ_{int}=V(x_s,y_s)$$

Examples of $dbZ_{int}$ along selected search radials are shown in FIGS. 3B, 3C and 3D corresponding to the search radials 309A, 309B and 309C in FIG. 3A.

Step 4: Local reflectivity maxima along each radial are determined. In some implementations, the "findpeaks" function in MATLAB, which can be found on the "mathworks" web site at: (https://www.mathworks-.com/help/signal/ref/findpeaks.html), can be used to locate local maxima using a peak threshold ($dbZ_x$), peak prominence ($dbZ_{pr}$), and peak separation distance (sd), wherein the choice of these thresholds is discussed below. In some implementations, up to two peaks are found and the largest is selected to estimate the wildfire point ($x_p$,$y_p$) as a primary peak. Secondary peaks are stored as potential spot fire locations ($x_{sp}$,$y_{sp}$), and a "back edge" point ($x_b$,$y_b$) is also identified, which is the first point along the radial dropping below 90% of the reflectivity peak, provided the peak is above 40 dbZ. This point is used to capture the breadth of the region actively combusting in the most intense portions of the head fire. Examples of the peak detection (triangles 312, 322 and 332) and the "back edge" point (triangles 314, 324 and 334) are shown in FIGS. 3B, 3C and 3D.

Results discussed herein are based on threshold values of $dbZ_x$=30 dbZ, 231 $dbZ_{pr}$=5 dbZ and sd=500 m. The sensitivity to these values was examined using 27 threshold permutations ($dbZ_x$=25, 30, 35 dbZ, $dbZ_{pr}$=5, 8, 12 dbZ, sd=500, 1000, 1500 m). These threshold combinations yield qualitatively similar results at a benchmark time (1845 UTC on 8 Nov. 2018) when high resolution IR data from L8 are available. The key differences are fewer fire detection points ($x_p$,$y_p$) for larger threshold values and fewer spot fires for larger prominence thresholds. The similarities amongst these permutations suggest that the fundamental aspects of the tracking algorithm are minimally sensitive 238 to the range of examined thresholds, though future work with additional validation datasets is 239 warranted.

Step 5: Once the fire-points ($x_p$,$y_p$) are estimated for all search radials centered on the three search points (up to 2160 points per time step) the data are refined by eliminating fire-points with fewer than 15 previous and current fire perimeter points within a 5 km radius. This removes fire-points that are separated from the quasi-continuous fire perimeter that occur due to small spot fires or spurious peaks in the reflectivity data, which can occur due to a variety of reasons (e.g., suppression aircraft yielding reflectivity maxima). In some embodiments, however, these eliminated points are preserved as potential spot fires ($x_{sp}$,$y_{sp}$) but are not included in the polygon perimeter estimate (next step). In FIG. 3A there are three squares (nearly on top of one another) indicating points that were removed in this process.

Step 6: The remaining data points ($x_p$,$y_p$) are added to a "point cloud" of all previous fire detections. These points are shown in FIG. 3A as scattered black squares. In an implementation, a polygon is then fit to the perimeter of the point cloud using MATLAB's "boundary" function with a default shrink factor of 0.5 (values can range from 0-1, with 0 providing the convex hull and 1 providing the most compact polygon possible). Since the resulting polygon ($x_{perim}$,$y_{perim}$) encompasses the current and previous fire points, it is an estimate of the fire perimeter, and can only grow in time. An example of this polygon is shown as the light gray line in FIG. 3A, and we note that this perimeter does not include spot fire or back edge data points. In some embodiments, the process next loops back to Step 1, once again estimating the perimeter polygon's major axis by fitting an ellipse to the perimeter points ($x_{perim}$, $y_{perim}$) and then determining the three search points for the next time step.

Embodiments disclosed herein include a rate-of-spread estimation, wherein the radar-derived fire perimeters enable estimation of the fire's rate-of-spread (ROS). This is accomplished by constructing a continuous x, y, time (t) surface from perimeter polygons. A cartesian spatial grid of 250 m ($x_{grid}$, $y_{grid}$) is used, and a Delaunay triangulated interpolant is created of the form:

$$V=F(x_{perim},y_{perim}),\text{time})$$

$$\text{TOA}=V(x_{grid},y_{grid})$$

where the resulting time-of-arrival (TOA) surface is analogous to the "level-sets" produced in numerical fire-spread codes (e.g., WRF-FIRE). In implementations, the TOA surface is then smoothed using a 5×5 median filter to reduce complexities in the perimeter shape before estimating ROS. ROS is computed by finding the distance between fire isochrones at 15-minute intervals. This is accomplished by searching along line segments normal to the fire perimeter until the next perimeter is encountered. This approach assumes that the fire is moving outward from each point along the perimeter, and the computed ROS captures both the spread through surface fuels and via long-range spotting events (i.e., multi-kilometer ember transport), which yields very large ROS values. The forward ROS is subsequently defined as the upper quartile (>75%) of ROS values along the entire perimeter at each time, which captures the most rapidly expanding portion of the fire at each interval.

Four sources of infrared data were used to compare with the radar perimeters resulting from the processing disclosed above. These are (1) L8 IR, (2) VIIRS fire detections, (3) GOES17 4 μm brightness temperature, and (4) NIROPs perimeters. The spatial resolutions of these data sets are 30 m, 375 m, 2 km, and –10 m, respectively. L8 data are only available at 1045 UTC on 8 Nov. 2018 during the Camp fire, and thus provide an excellent validation point, but exclude information about fire spread. The VIIRS data are available daily at –2130 UTC, and the GOES17 data are available at 5-minute intervals. NIROPS data are available at 0154 UTC on 9 Nov. 2018 for the Camp fire, and 2230 UTC on 9 Sep. 2020 during the Bear fire. However, there are no NIROPS data for the Bear Fire on the day of the radar analysis (November 8th) due to mechanical issues with the aircraft. In addition to IR data, data detailing the time and location of vegetation, structure, and spot fires as compiled in a publicly available National Institute of Standards (NIST) report which summarizes the spread of the Camp Fire were used. The underlying data sources included civilian and firefighter photographs and 911 reports. From this data set the times and locations of all reported fires were extracted to compare with the radar estimated fire perimeter.

Radar perimeter tracking for the Camp and Bear Fires utilizing the process disclosed herein were compared to the meteorological drivers to determine how well the radar derived perimeter agree with available IR observations.

Figure 4A:
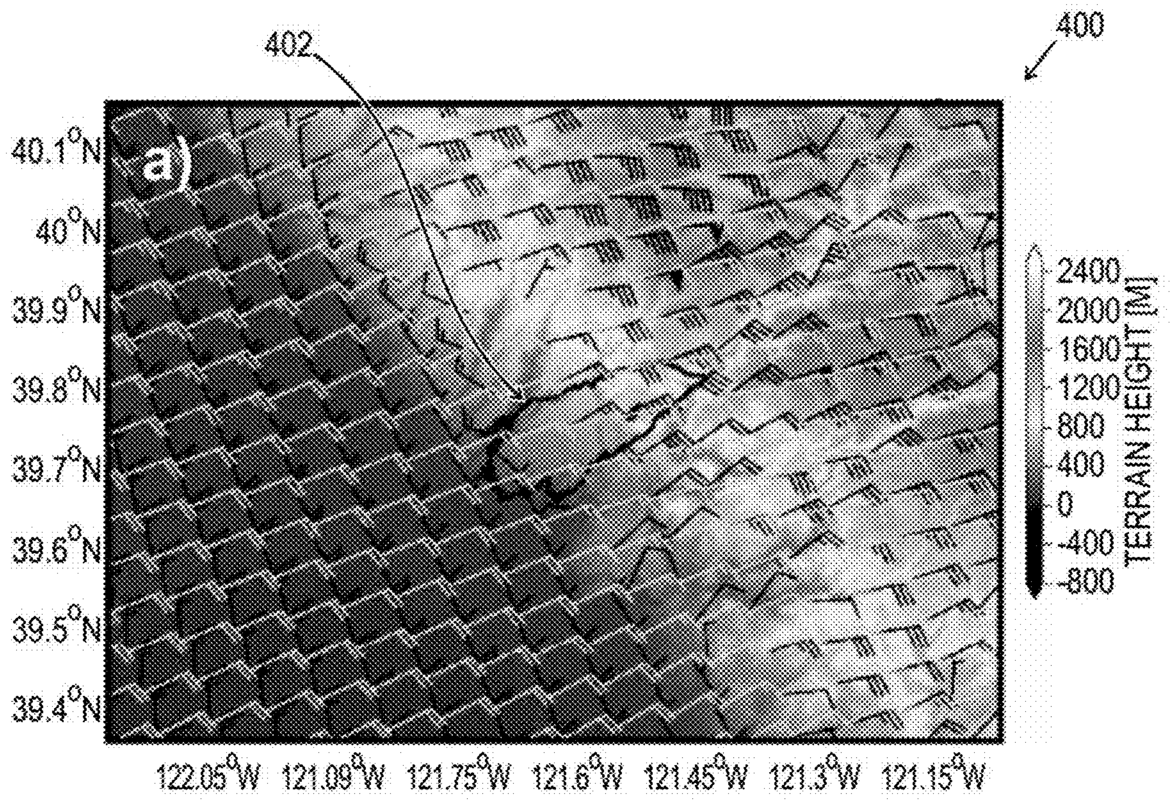
FIG. 4A is a graph depicting an overview of the meteorology (including terrain and windspeed indications) during the Camp Fire.

FIG. 4A is an overview 400 of the meteorology data during the Camp Fire which was ignited on 8 Nov. 2020 near Pulga, California and grew rapidly under the influence of a strong downslope windstorm that generated near-surface winds of 20-25 mph (miles per hour) from the northeast. Shown in FIG. 4A are wind barb representations of wind strength along with the wildfire perimeter 402 and the topography (shaded portions) of the area.

Figure 4B:
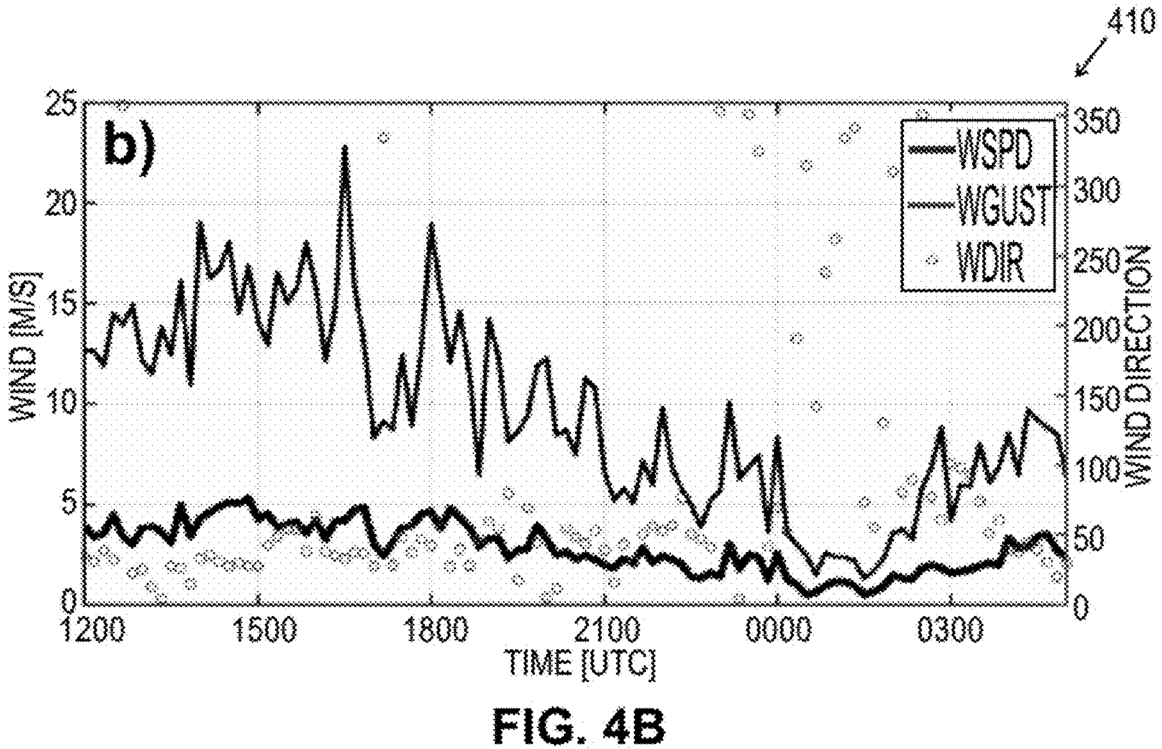
FIG. 4B is a graph depicting a time series of wind speed and direction from a station named PG131 near the Camp Fire.
Figure 5A:
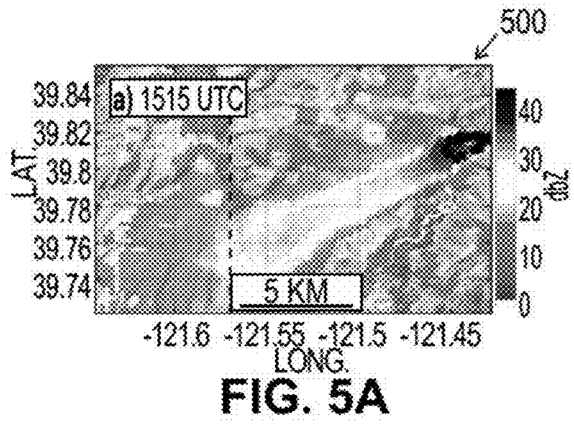
FIGS. 5A-5F illustrate the radar-derived fire progression revealing the rapid growth of the Camp Fire from shortly after its ignition.
Figure 5B:
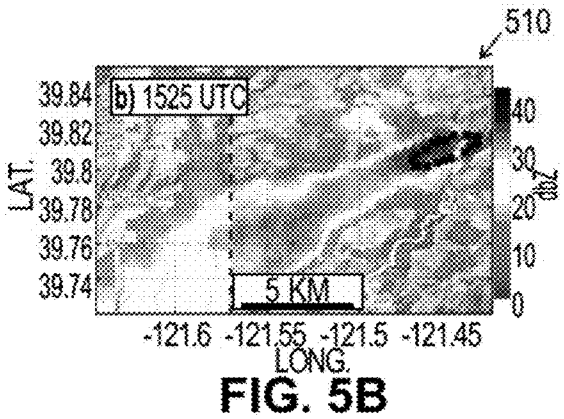
Figure 5C:
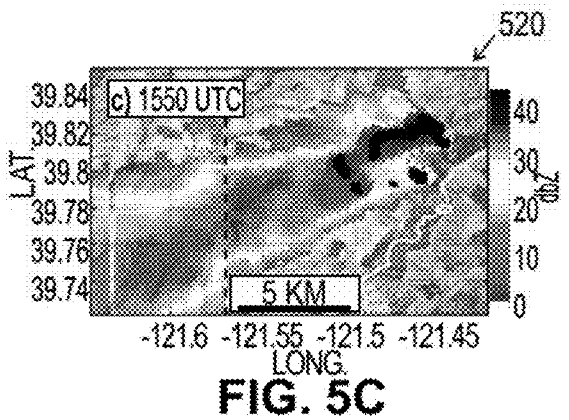
Figure 5D:
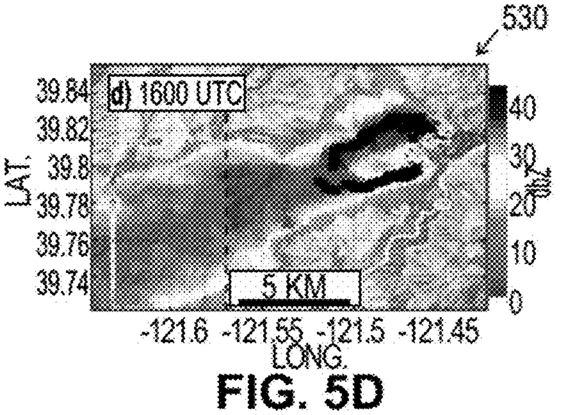
Figure 5E:
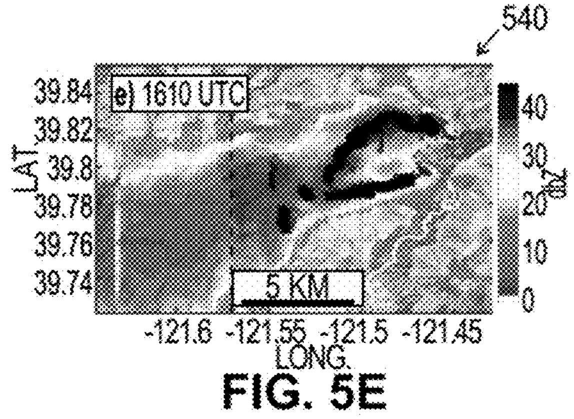
Figure 5F:
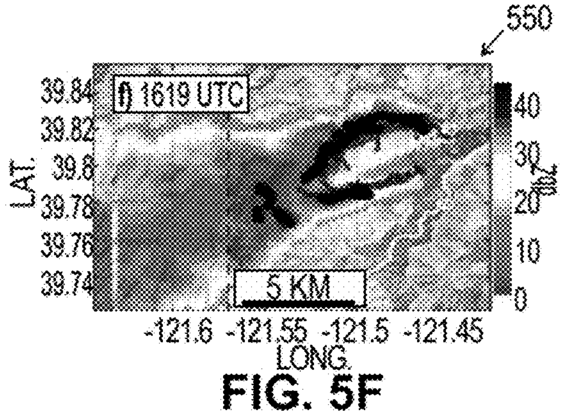

FIG. 4B depicts the time series of wind speed and direction 410 from a station named PG131 near the wildfire. The Camp Fire spread rapidly from northeast to southwest, burning through Paradise, California and complicating the evacuation of approximately 50,000 people from Paradise and the adjacent communities. The Camp Fire became the deadliest and most destructive wildfire in California history and was a leading motivation to develop the method disclosed herein for providing near-real time estimates of fire spread from radar observations.

FIGS. 5A-5F illustrate the radar-derived fire progression 500, 510, 520, 530, 540 and 550 which reveals the rapid growth of the Camp Fire from shortly after its ignition. (An animation of this progression is also available in S1). Each panel making up FIGS. 5A-5F shows the radar reflectivity (shaded), the current time step's fire detections (large filled black squares), potential spot fires (open squares), all previous fire detections (small black squares), and the eastern edge of Paradise (black dashed line). Taken as a sequence, these radar data show rapid along-wind progression (NE-SW), some terrain-driven growth to the north (FIGS. 5C, 5D and 5E), and a number of jumps in the location of the head fire indicative of long-range spotting. For example, between 1550 UTC and 1620 UTC (FIGS. 5C, 5D AND 5E) the radar-indicated head fire "jumps" 3 km to 4 km to the west-southwest. Jumps in the location of the head fire continue up until 1656 UTC, when the main fire front becomes established in Paradise, California. This progression is consistent with emergency 911 calls and photographic evidence in the NIST report indicating that the main fire front arrived at approximately 1645 UTC, with numerous spot fires prior to that time. From 1645 UTC forward, a well-developed fire-front was evidenced by high radar reflectivity and continuous north-south oriented radar derived head fire detections.

Figure 6:
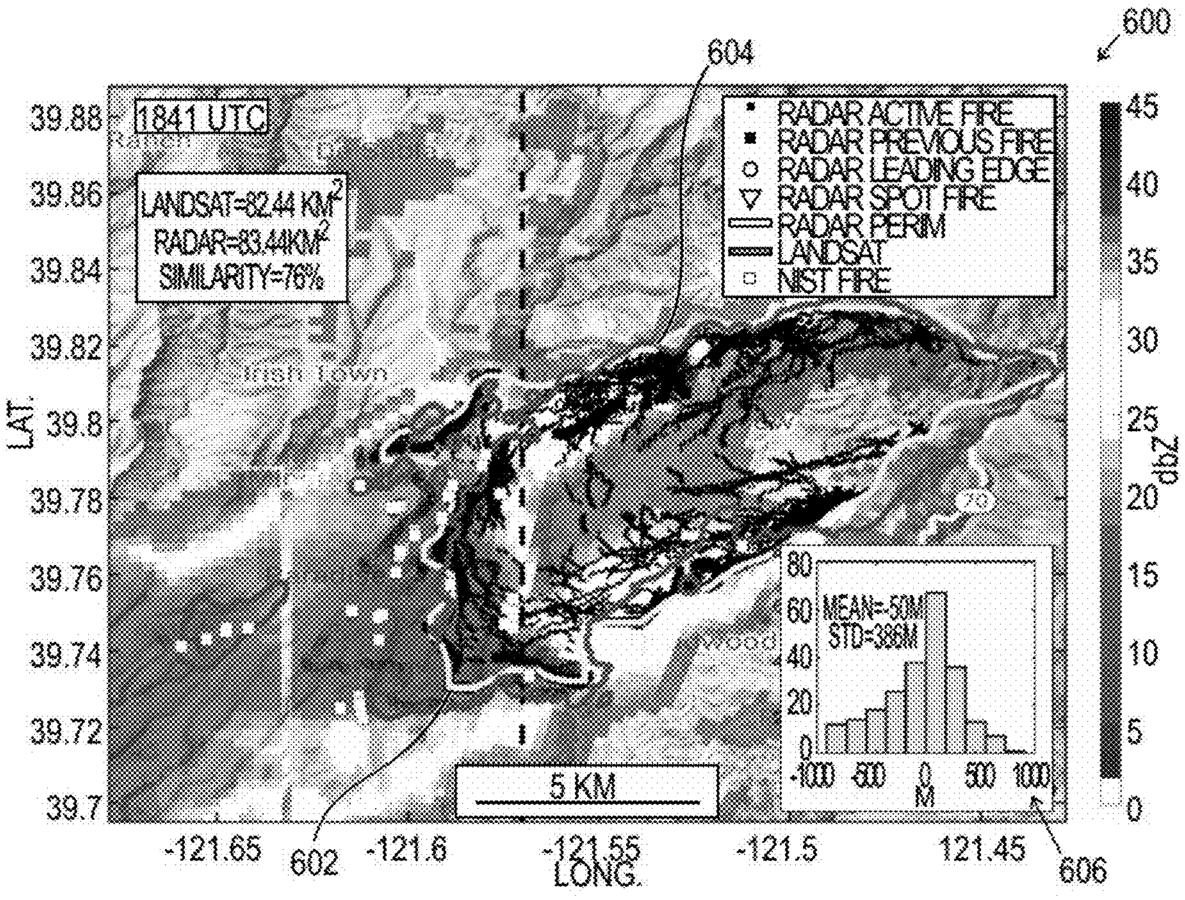
FIG. 6 is a graph illustrating a comparison of radar-derived and LANDSAT8 (L8) fire observations during the Camp Fire.
Figure 7A:
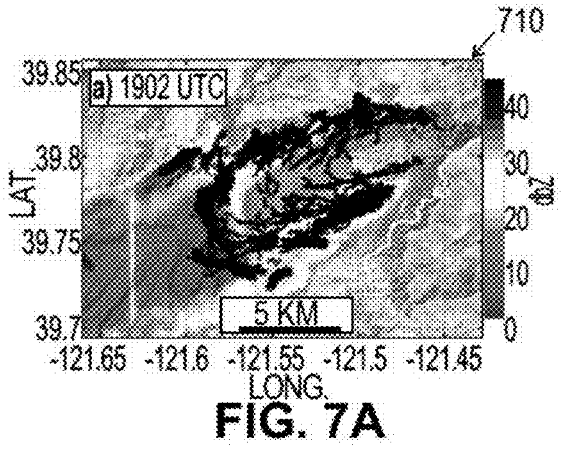
FIGS. 7A-7F are graphs of the radar-derived fire progression from 1900-2130 UTC during the Camp Fire in accordance with some embodiments.
Figure 7B:
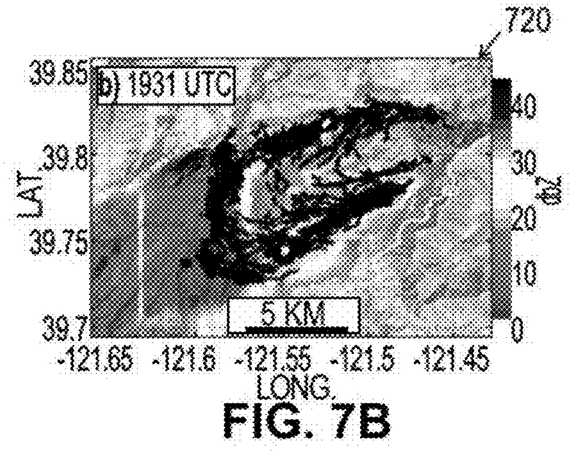
Figure 7C:
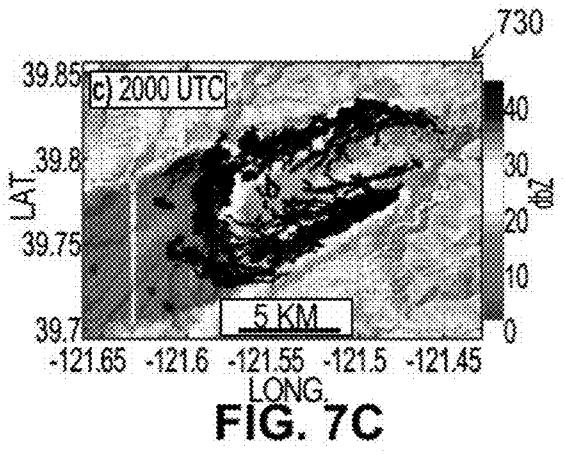
Figure 7D:
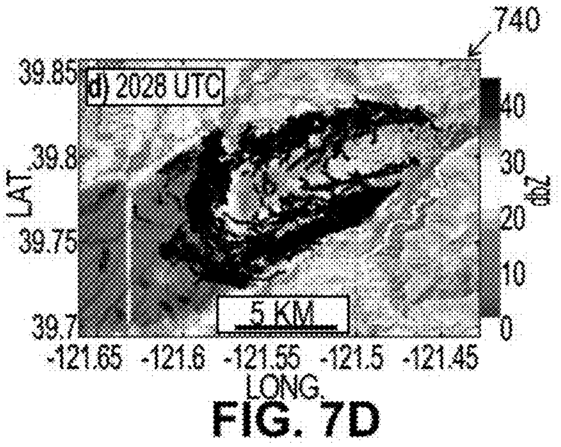
Figure 7E:
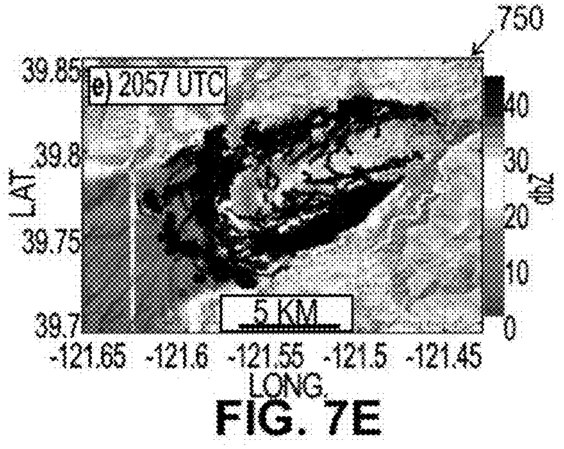
Figure 7F:
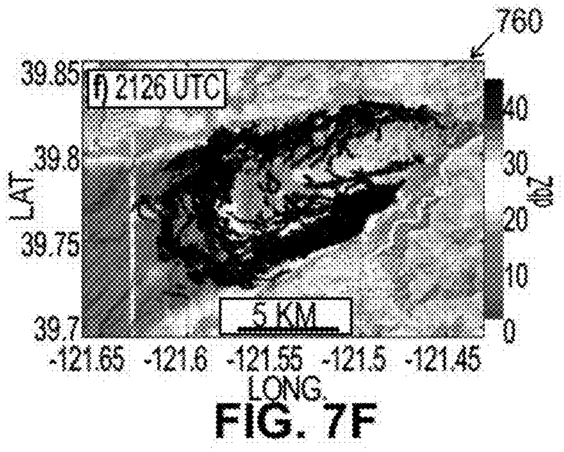

FIG. 6 is a graph 600 illustrating a comparison of radar-derived and LANDSAT8 (L8) fire observations during the Camp Fire. Shown are the radar reflectivity (shaded), current radar-estimated fire perimeter points (large, solid black squares), "back-edge" radar-estimated fire perimeter (open black circles), spot fires (open black triangles), and previous fire perimeter points (small black squares). Also shown is the polygon fit 602 to the radar detections and the LANDSAT8 estimated perimeter 604. Annotations show the fire area for the LANDSAT8 and radar perimeter and the polygon similarity, and the NIST reported spot, structure, and vegetation fires. The inset shows the distribution of minimum distances between the radar estimated perimeter and the LANDSAT8 perimeters, with negative values indicating points falling within the L8 polygon.

The accuracy of the radar perimeter is first established at 1845 UTC by comparing with IR perimeter derived from L8. The radar derived perimeter line 602 shows good qualitative and quantitative agreement with the L8 data. To be specific, both perimeter estimates provide similarly shaped and sized (82.4 km2 vs. 82.5 km2) polygons for the main core of the fire. The polygon similarity is given by:

$$\text{Similarity}=1-((\text{area}(P1\cup P2)-(\text{area}(P1\cap P2))/(\text{area}(P1\cup P2)$$

Where P1 and P2 are the radar and L8 polygons, and 76% indicates good overlap in the polygon representation of the fire's footprint, excluding spot fires (i.e., comparing only the largest L8 polygon with the radar data). Importantly, the radar data indicate similar nuances in the fire's shape, including the southward extension of the head fire.

There is also good agreement in the location of major spot fires. L8 indicates a large spot fire about 4 km west of the primary fire front, and a grouping of radar "secondary maxima" (open black triangles) fall within this spot fire and correspond to an obvious increase in the radar reflectivity in the vicinity. L8 also indicates numerous smaller spot fires within about 2 km of the fire front. These points mostly fall within the "back edge" of the radar data (open black circles), which approximates the breadth of the combusting region. The NIST reported fires provide further evidence for the fidelity of these radar estimates, though some of the fires fall just outside of the radar estimated combustion region.

Additional error statistics for the radar-estimated perimeter are obtained by computing the distribution of the minimum distances between each point along the radar perimeter (see line 602 in FIG. 6) and the L8 polygons, as shown in the inset histogram 606 of FIG. 6. The minimum distance is the shortest Euclidian distance between a given radar estimated point and the vertices of all the L8 IR polygons, including the numerous spot fires. Negative (positive) distances indicate radar points falling outside (inside) the L8 polygons. These data show that the distribution of error is quasi-gaussian, roughly centered on zero (mean of –50 m), and has a standard deviation of 386 m. These statistics demonstrate how, in the future, uncertainty bounds for the radar perimeters can be established, especially if these data are to be assimilated into numerical models (e.g., WRF-SFIRE).

FIGS. 7A-7F are graphs 710 to 760 of the radar-derived fire progression from 1900-2130 UTC during the Camp Fire in accordance with some embodiments. Each of these graphs 710, 720, 730, 740, 750 and 760 shows the radar reflectivity (shaded), the current fire perimeter estimates (solid black squares), previous perimeter points (small black squares) and a meridian indicating the eastern edge of the town of Paradise, California. The continual growth of the Camp Fire as shown in FIGS. 7A-7F reveals complex progression through Paradise, including the combustion of thousands of homes and structures. During this time the Camp Fire develops three distinct high reflectivity cores linked to the northern, central, and southern portions of the advancing fire front wherein each core appears to be linked to both spotting and localized fire progression. Despite these complexities the comparison with VIIRS fire detections at 2130 UTC indicate good agreement as will be discussed in more detail below.

Figure 8:
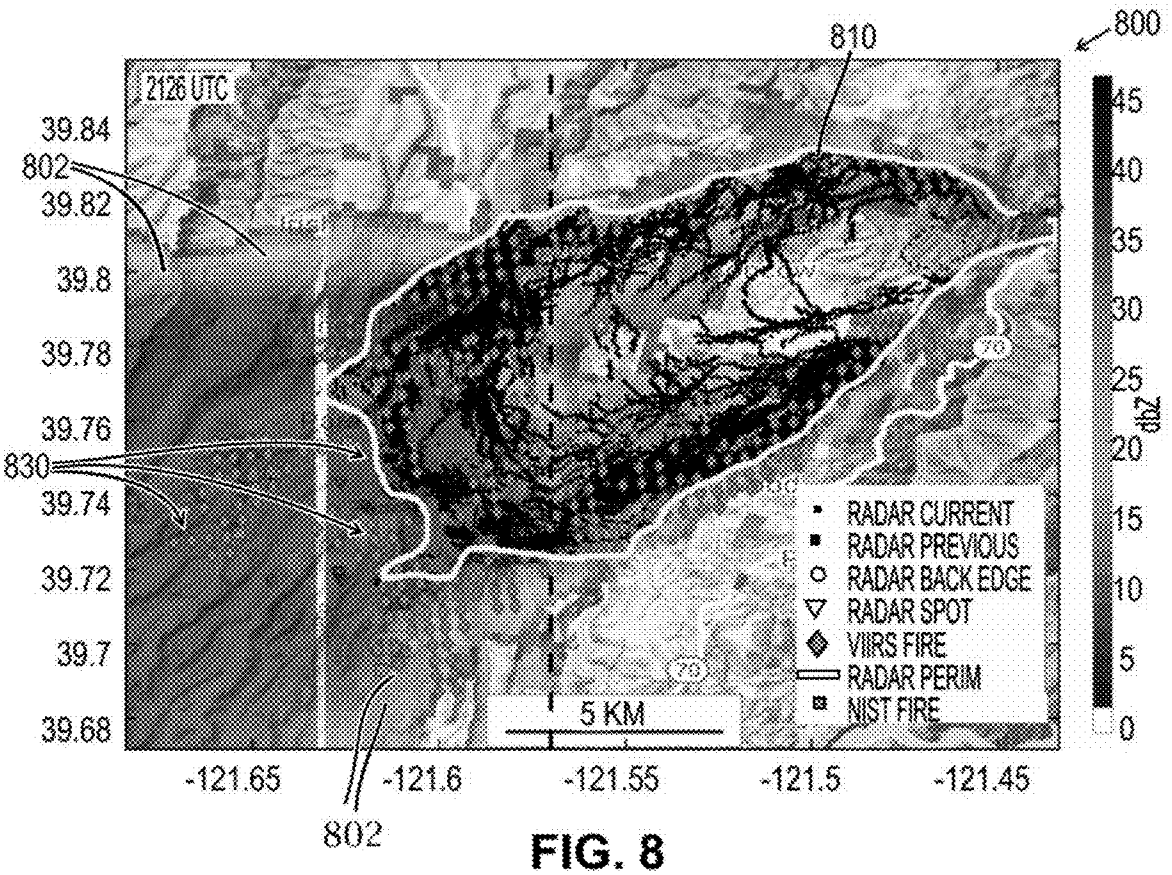
FIG. 8 is graph comparing the radar-derived and VIIRS fire observations at 2126 UTC.

FIG. 8 is graph 800 comparing the radar-derived and VIIRS fire observations at 2126 UTC. Shown are the radar reflectivity (shaded), current radar-estimate fire perimeter points (large, solid black squares), "back-edge" radar-estimated fire perimeter (open black circles), spot fires (open black squares), and previous fire perimeter points (small black squares). Also shown is the polygon fit line 810 to the radar detections and the VIIRS active fire pixels (diamond shapes). NIST reported spot, structure, and vegetation fires 820 are also shown.

As depicted in FIG. 8, the best agreement occurs is in the main body of the fire, with less agreement along the southwest flank 830 of the advancing Camp Fire. In this region the radar data indicated possible spot fires and a "back edge" of the combustion zone, but no continuous fire perimeter. NIST data indicate confirmed spot and structure fires in this region. It should be noted, however, that some of the VIIRS detections may have suffered from "hot plume" contamination. After 2130 UTC the fire continued rapidly to the southwest. To summarize this portion of the fire spread, and the fire evolution as a whole, the aggregated radar "point cloud" was compared with a NIROPS perimeter obtained at 0154 UTC (1754 PST; See FIG. 9).

Figure 9:
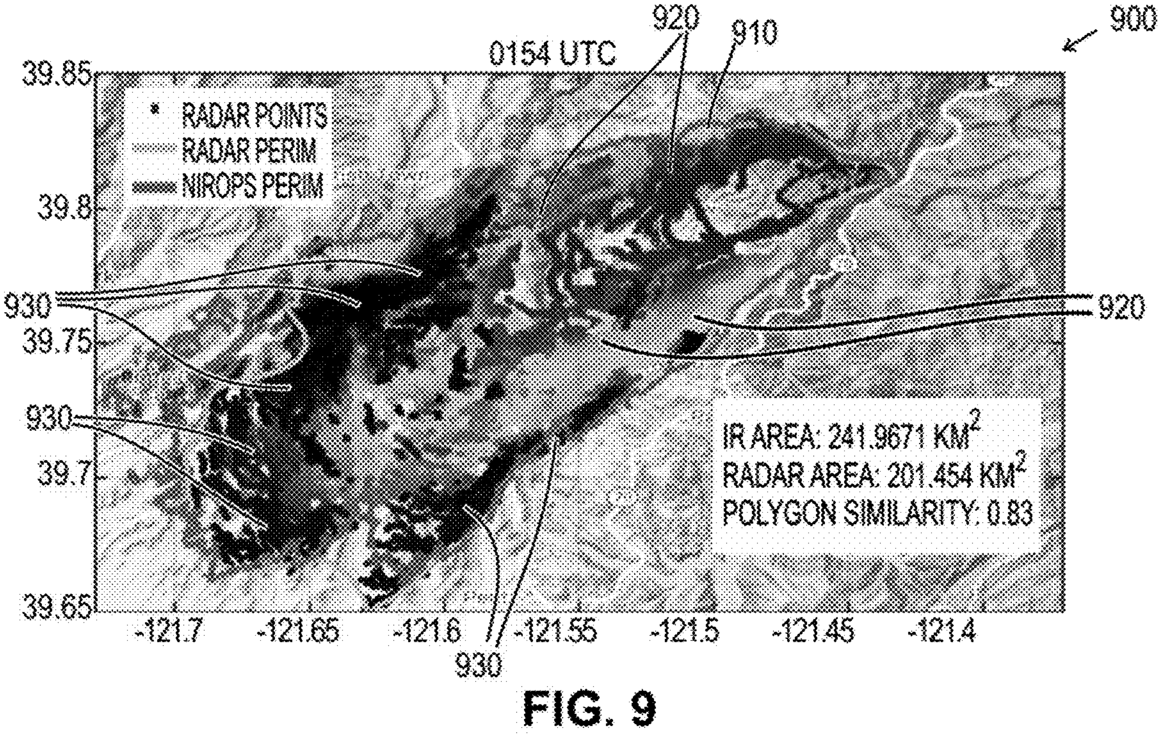
FIG. 9 is a snapshot of the radar-detected fire perimeter points compared to the NIROPS fire perimeter line 910 at 0154 UTC on 9 Nov. 2018.

FIG. 9 is a snapshot 900 of the radar-detected fire perimeter points compared to the NIROPS fire perimeter line 910 at 0154 UTC on 9 Nov. 2018. The shaded portions 920 are earlier radar detections and the shaded portions 930 are later radar detections. The annotations show the polygon areas and similarities. As shown, the agreement for most of the fire perimeter is striking, with radar detected points filling most of the IR perimeter, including lobes and nuances in the fire shape. There are some discrepancies over the northwest (NW) portion of the fire, but only a scattering of radar estimated points fall outside of the IR perimeter, and this was after approximately 20 hours of unsupervised tracking by the radar algorithm. The polygon similarity is about 83%, which exceeds the similarity at earlier times.

Figure 10A:
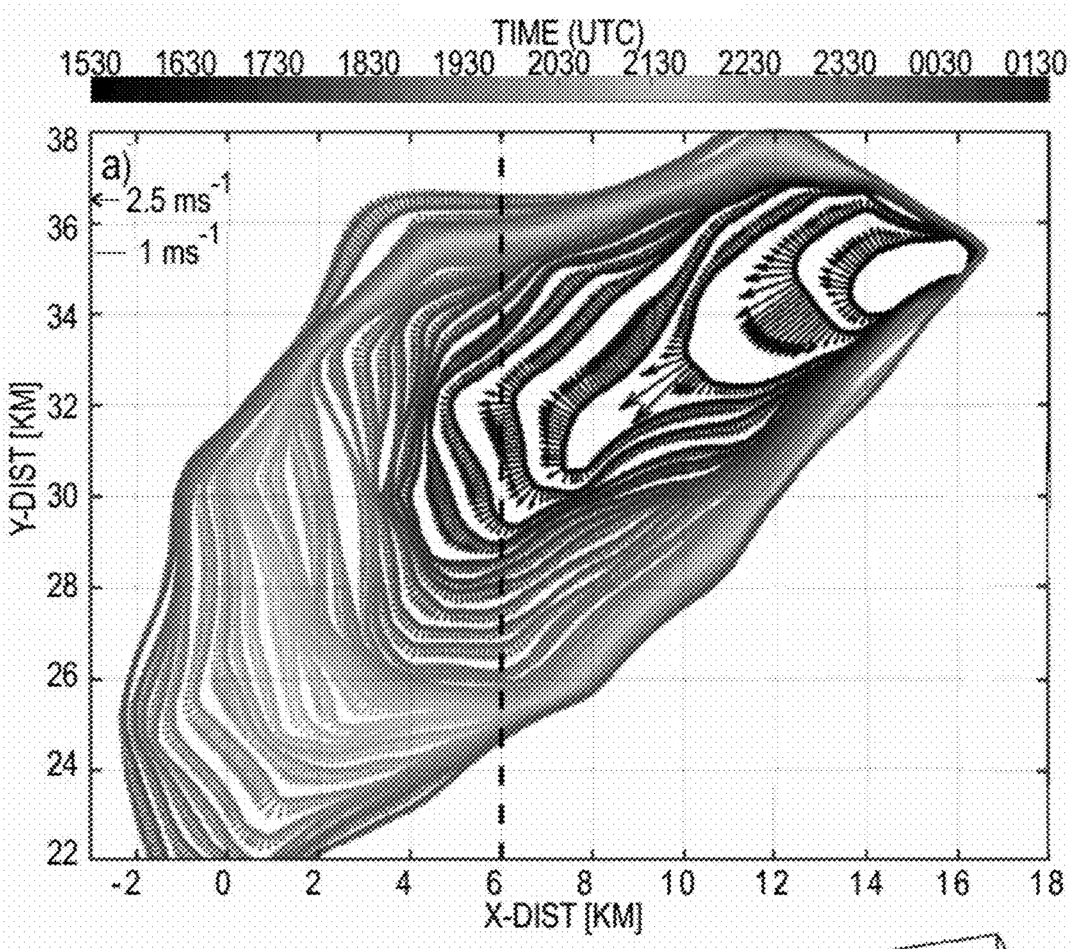
FIG. 10A depicts an overview for the period of 1530-0130 UTC of the Rate-of-Spread (ROS) computed from radar-estimated perimeters along with spread vectors, with the fire spreading generally from the upper right to lower left in the depiction, with vector scaling is included in the top left corner.
Figure 10B:
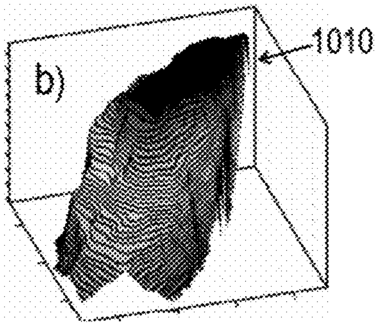
FIG. 10B depicts the Time-of-Arrival (TOA) surface.
Figure 10C:
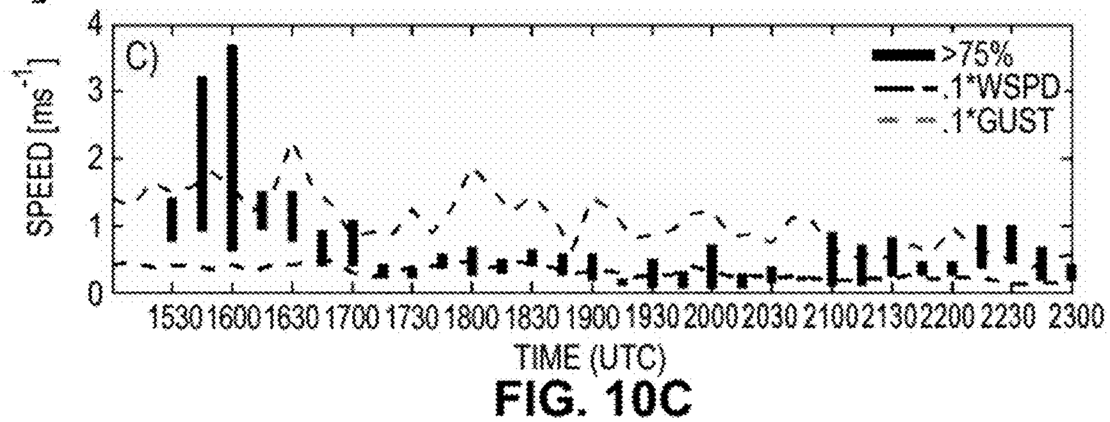
FIG. 10C shows a time-series of the forward ROS 1020, defined as the upper quartile of ROS along the perimeter and the wind speed and wind gust observations from station PG131, scaled by 0.1.

FIG. 10A depicts an overview 1000 for the period of 1530-0130 UTC of the Rate-of-Spread (ROS) computed from radar-estimated perimeters along with spread vectors, with the fire spreading generally from the upper right to lower left in the depiction, with vector scaling included in the top left corner. FIG. 10B depicts the Time-of-Arrival (TOA) surface 1010, and FIG. 10C shows a time-series of the forward ROS 1020, defined as the upper quartile of ROS along the perimeter and the wind speed and wind gust observations from station PG131, scaled by 0.1. The accompanying time series shown in FIG. 10C shows the temporal distribution of forward ROSs along the perimeter (i.e., the upper quartile of ROS for the perimeter as a whole). Taken together, these data indicate maximum forward ROSs of 1-3.5 m s−1 early in the fire's growth. These large forward ROSs are an order of magnitude larger than in most wildfires and exceed those reported for a selection of crown fires in (e.g., maximum of about −1 m s−1). The observed ROS has also been placed in the context of the ambient wind speed and gusts (black and red dashed lines respectively) from a nearby weather station (PG131) to examine the applicability of the "10% rule" wherein a fire's forward ROS is approximated as 10% of the ambient wind (in any unit).

As derived from the data shown in FIGS. 10A-10C, during the early growth of the Camp Fire the ROS is as much as 6 times greater than the 10% rule, whereas later the ROS roughly corresponds with 10% of the wind speed and gusts. As suggested in the radar snap shots, the rapid early growth is due, in part, to long-range spotting, which drove the Camp Fire forward as much as three kilometers (3 km) in just 15 minutes. It should also be noted that in a macroscopic sense the wildfire traveled about 12 km from its origin at approximately 1430 UTC to Paradise at about 1645 UTC (see NIST report), implying an impressive bulk ROS of approximately 1.2 m $s^{-1}$.

In summary, the radar perimeter estimates for the Camp Fire agree well with IR snapshots at three intervals and provide insights into the fire's progression. This good performance suggests that radar tracking can provide important tactical and operational details on fire spread.

Figure 11:
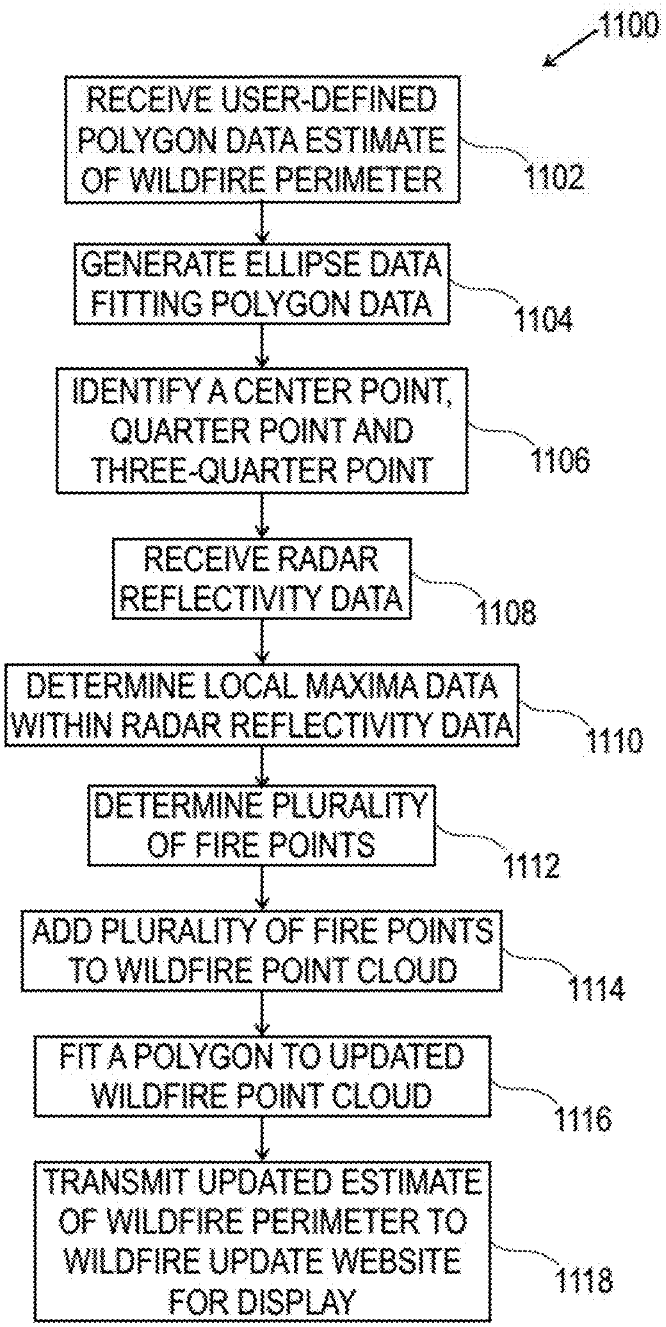
FIG. 11 is a flowchart of a method for providing timely and accurate information concerning the location and rate-of-spread of wildfires according in accordance with some embodiments.

FIG. 11 is a flowchart 1100 of a method for providing timely and accurate information concerning the location and rate-of-spread of wildfires according to an embodiment and the disclosures made herein. A computer processor that is operably connected to at least one input device, at least one output device and a communications component, receives 1102 user defined polygon data which estimates a perimeter of a wildfire. In some implementations, the user may utilize a graphical user interface (GUI), not shown, to fit the polygon to a current estimate of the wildfire and provide that data to the computer processor.

In implementations disclosed herein, the computer processor next generates 1104 ellipse data fitting the polygon data and then identifies 1106, based on the ellipse data, a center point, a quarter-point and a three-quarter point of a major axis of an ellipse defined by the ellipse data. The computer processor then receives 1108 radar reflectivity data from at least one weather radar. For example, radar reflectivity data may be received from one or more fixed weather radars and/or from one or more mobile radars or portable radars. Such fixed and/or mobile weather radars may be operated and/or positioned by local government and/or federal government agencies such as the National Weather Service (NWS), the Federal Aviation Administration (FAA), the U.S. Air Force, the U.S. Forest Service, the Bureau of Land Management, the National Park Service and/or local government agencies (e.g., California Department of Forestry and Fire Protection).

Referring again to FIG. 11, the process also includes the computer processor determining 1110, by radially searching outwardly from the center point, the quarter-point and the three-quarter point of the major axis of the ellipse, local maxima data within the radar reflectivity data. The computer processor then determines 1112 a plurality of fire points based on the local maxima data, adds 1114 the plurality of fire points data to a wildfire point cloud representing the wildfire to update the wildfire point cloud, and then fits 1116 a polygon to the updated wildfire point cloud to generate an updated estimate of the perimeter of the wildfire. In some embodiments, the computer processor then transmits 1118 the updated estimate of the perimeter of the wildfire to a wildfire update website for display. The wildfire update website can then be utilized by users, such as emergency workers and firefighters, to track the estimated wildfire perimeter data and to then make decisions such as how to deploy resources to fight the wildfire, and to determine whether people should evacuate from any dangerous area(s).

Figure 12:
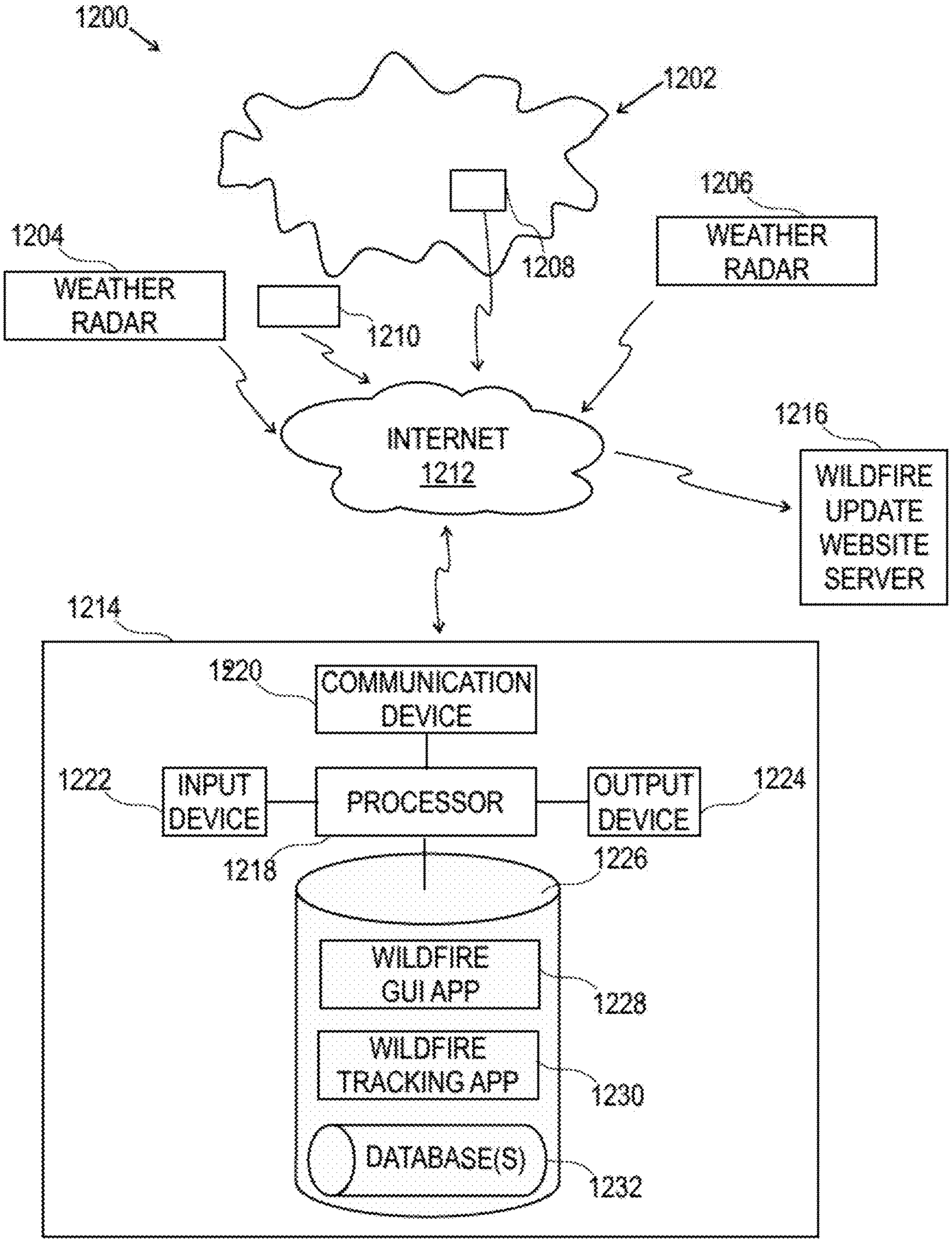
FIG. 12 is a block diagram of a wildfire update system in accordance with some embodiments.

FIG. 12 is a block diagram of a wildfire update system 1200 in accordance with some embodiments of the disclosure. The wildfire update system utilizes radar data to generate and provide timely and accurate updates concerning the location and rate-of-spread of one or more wildfires 1202.

Referring to FIG. 12, in this example system a wildfire 1202 is being monitored by one or more weather radars 1204 and 1206, and in some implementations may also be monitored by one or more mobile radars 1208 and 1210. In some embodiments, the wildfire update system 1200 includes the radars 1204-1210, a user device 1214, and a wildfire update website server 1216 that are operably connected to a network 1212 such as the Internet. In other embodiments, the radars 1204-1210 may directly communicate with the user device 1214 and/or the wildfire update website server 1216. It should be understood that, for the sake of clarity, only one user device 1214 and one wildfire update server computer 1216 are shown in FIG. 12 but in some implementations those blocks represent more than one device or computer operable to provide the functionality described herein.

The user device 1214 may include standard and/or custom-designed and/or proprietary components in terms of its hardware and/or architecture and may be controlled by software to cause it to function as disclosed herein. In some embodiments, the user device 1214 includes a processor 1218 operatively connected to a communication device 1220, an input device 1222, an output device 1224, and a storage device 1226. The processor 1218 may be constituted by one or more processors, and operates to execute processor-executable steps, contained in program instructions that provide the desired functionality.

Referring again to the user device 1214, the communication device 1220 may be used to facilitate communication with, for example, other devices such as the radars 1204-1210 and the wildfire update website server 1216), and numerous other computers and/or electronic devices (not shown). For example, communication device 1214 may include numerous communication ports (not separately shown), to allow the user device to communicate simultaneously with a number of other computers and other devices, including communications as required to simultaneously process numerous wildfire data provided by one or more radars. Thus, the communication device may be configured for wireless communications and/or wired communications via various different types of networks, such as the Internet 1212.

Input device 1222 may comprise one or more of any type of peripheral devices typically used to input data. For example, the input device 1222 may include a touchscreen and/or a keyboard and a mouse (not shown). The device 1224 may comprise, for example, a display and/or a printer. In some embodiments, both the input device 1222 and the output device 1224 comprise a touch screen.

Storage device 1226 may comprise any appropriate information storage device, including combinations of magnetic storage devices (e.g., magnetic tape and hard disk drives), solid state devices (SSDs), optical storage devices such as compact discs (CDs) and/or DVDs, and/or semiconductor memory devices such as Random Access Memory (RAM) devices and Read Only Memory (ROM) devices, as well as flash memory and/or bubble memory. Thus, the storage device 12226 is a non-transitory computer readable medium and/or any form of computer readable media capable of storing computer instructions and/or computer program instructions and/or application programs and/or data. It should be understood that non-transitory computer-readable media as disclosed herein include all computer-readable media, with the sole exception being a transitory, propagating signal.

In some embodiments, the storage device 1226 stores one or more computer programs 1228 that include processor executable instructions which when executed cause the processor 1218 to provide the disclosed functionality. In some embodiments, the storage device 1226 stores a wildfire graphical user interface (GUI) application 1228 that includes processor executable instructions which when executed cause the processor to provide a user with a wildfire GUI wherein the user may enter data and/or instructions resulting in defining and/or fitting a polygon (as described herein) to a current estimate of the wildfire. In some implementations, the storage device 1226 also includes a wildfire tracking application 1230 that includes processor executable instructions which when executed by the processor 1218 generates an updated estimate of the perimeter of the wildfire. The wildfire tracking application may also include instructions that when executed cause the processor 1218 to transmit the updated estimate of the perimeter of the wildfire to the wildfire update website server 1216. Accordingly, in some applications the GUI application 1228 and the wildfire estimation application 1230 together include processor executable instructions which when executed cause the processor to receive data, and to generate and transmit wildfire data that provides timely and accurate updates concerning the location and rate-of-spread of one or more wildfires, which can be accessed by entities and/or people such as firefighters, state and local government agencies, and the general public by utilizing the wildfire update website.

Referring again to FIG. 12, in some embodiments the storage device 1214 may also store also store one or more databases 1232 which include, for example, weather radar date, wildfire related data, and the like. Moreover, the application programs stored in the storage device 1226 of the user device 1214 may be combined in some embodiments, as convenient, into one, two or more application programs. In addition, the storage device 1226 may store other computer programs (not shown), such as one or more operating systems, device drivers, database management software, web hosting software, and the like.

Accordingly, the radar-derived fire-perimeter tracking methods and systems disclosed herein provide solutions to the technological problem of how to provide accurate fire-perimeter estimates to emergency personnel and to the public in a timely manner that is superior to current methods which utilize available infrared data. The fire tracking method is based on the insight that local maxima in the radar reflectivity tend to occur above the head and flanking fire. As discussed above, during the Camp Fire the radar-derived perimeters agree well (76-80% polygon similarity) with a fortuitous L8 overpass and a NIROPs infrared perimeter. The radar perimeters also agree well with VIIRS and GOES17 fire perimeter estimates, indicating that this approach can provide important tactical information in operational settings (e.g., amongst Incident Meteorologist, Emergency Managers, Fire Chiefs, etc.). The disclosed process beneficially provides accurate fire-perimeter estimates in real-time based on NEXRAD observations which are obtainable at high temporal and spatial resolution. In addition, the process advantageously leverages on the ability of radars to observe fire processes even during periods of dense smoke and cloud cover (including pyroCb), which can obscure satellite observations and preclude aircraft observations. For example, in the present study the radar data provide critical details of fire-progression during the Camp Fire's run into Paradise that were otherwise unavailable because of coarse satellite data (GOES) and weather conditions that precluded aircraft operations. An additional strength of the radar observations is that they contain more information than highlighted above, including information about plume height, plume geometry, plume microphysics, pyroCb initiation, and fire induced winds (e.g., Lareau et al. 2018; 2021). As such, a more comprehensive use of radar observations for fire situational awareness is warranted, as is further investigation of how to best extract information about fires from these data.

The processes disclosed herein include some weaknesses, including the fact that at a fundamental level radars do not directly measure the fire, but instead measure the pyrometeors produced by fires which, in some cases, could lead to a mismatch between the radar maxima and the fire perimeter due to drift of the plume. This issue may become more problematic for fires at long ranges from the fixed radar since the beam height is far above the surface. It should be noted, however, that the Camp Fire data analyzed herein did not suffer from this problem because the scan angle "skims" the ground, but in other locations (especially in remote regions) the technique may not work as well. Fortunately, for many of the at-risk population centers in the western US there is good NEXRAD coverage. Indeed, the disclosed process has been tested for other large fires observed with different NEXRAD radar sites in California, including the King Fire in 2014 and the Caldor Fire in 2021, wherein good performance was found as compared against aircraft IR perimeters, suggesting broad utility. Another limitation is the lack of radar scatters for low intensity fire, especially at night, though the primary use-case of the proposed approach is to track high-impact large wildfires in near-real-time, which are likely to produce ample radar scatters, and thus be well observed.

In addition to the potential operational utility of radar-based perimeter tracking, the subsequent time-of-arrival surfaces and fire perimeters can, and should, be used to drive coupled fire-atmosphere models (e.g., WRF-SFIRE). In so doing, uncertainties in semi-empirical fire-spread codes may be bypassed, forcing models to the observed perimeter and thus rendering more accurate short-term forecasts for fire spread. Such data could be used in "nowcasting" of fire spread. To better realize the nowcasting potential of these data, future research incorporating additional radar parameters (e.g., polarimetric observations), knowledge of fuel distributions, and the quantification of errors relative to available IR data should be considered.

As used herein, the term "computer" should be understood to encompass a single computer or two or more computers in communication with each other.

As used herein, the term "processor" should be understood to encompass a single processor or two or more processors in communication with each other.

As used herein, the term "memory" should be understood to encompass a single memory or storage device or two or more memories or storage devices.

As used herein, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of steps.

Although the present disclosure has been described in connection with specific example embodiments, it should be understood that various changes, substitutions, and alterations apparent to those skilled in the art can be made to the disclosed embodiments without departing from the spirit and scope of the disclosure.

What is claimed is:

1. A method for providing timely and accurate estimates of the location and rate-of spread of a wildfire comprising:

receiving, by a processor of a user device via an input device, user defined polygon data estimating a perimeter of a wildfire, wherein the processor is operably connected to the input device, an output device, a communication device and a storage device;

generating, by the processor, ellipse data fitting the polygon data;

receiving, by the processor via the communication device from at least one weatherradar, radar reflectivity data;

determining, by the processor based on the radar reflectivity data and the ellipse data, local maxima data and a plurality of fire points;

generating, by the processor based on the plurality of fire points, an updated estimate of the perimeter of the wildfire; and displaying the updated estimate of the perimeter of the wildfire on a screen or printing the updated estimate of the perimeter of the wildfire on a printer.

2. The method of claim 1, further comprising transmitting, by the processor via the communication device, the updated estimate of the perimeter of the wildfire to a wildfire update website.

3. The method of claim 1, further comprising, after generating the ellipse data:

identifying, by the processor based on the ellipse data, a center point, a quarter-point and a three-quarter point of a major axis of an ellipse defined by the ellipse data; and wherein determining the local maxima data comprises searching, by the processor radially outwardly from the center point, the quarter-point and the three-quarter point of the major axis of the ellipse within the radar reflectivity data.

4. The method of claim 1, wherein generating the updated estimate of the perimeter of the wildfire comprises:

adding, by the processor, the plurality of fire points data to a wildfire point cloud representing the wildfire; and fitting, by the processor, a polygon to the wildfire point cloud to generate the updated estimate of the perimeter of the wildfire.

5. The method of claim 1, further comprising, prior to receiving the user defined polygon data:

displaying, by the processor, a wildfire graphical user interface (GUI) on a touch screen comprising the input device for use by the user.

6. The method of claim 1, wherein the at least one weather radar comprises a fixed weather radar.

7. The method of claim 1, wherein the updated estimate of the perimeter of the wildfire is printed on a printer.

8. A user device for providing timely and accurate estimates of the location and rate-of spread of a wildfire comprising:

a processor;

an input device operably connected to the processor;

an output device operably connected to the processor;

a communication device operably connected to the processor; and a storage device operably connected to the processor, wherein the storage device stores processor executable instructions which when executed cause the processor to:

receive, via the input device, user defined polygon data estimating a perimeter of a wildfire;

generate ellipse data fitting the polygon data;

receive, via the communication device, radar reflectivity data from at least one weather radar;

determine, based on the radar reflectivity data and the ellipse data, local maxima data and a plurality of fire points;

generate an updated estimate of the perimeter of the wildfire based on the plurality of fire points;

displaying the updated estimate of the perimeter of the wildfire on a screen or printing the updated estimate of the perimeter of the wildfire on a printer.

9. The user device of claim 8, wherein the storage device stores further processor executable instructions which when executed, after the processor executable instructions form generating the ellipse data, cause the processor to:

identify, based on the ellipse data, a center point, a quarter-point and a threequarter point of a major axis of an ellipse defined by the ellipse data; and wherein the storage device stores further processor executable instructions which when executed cause the processor to determine the local maxima data by searching radially outwardly from the center point, the quarter-point and the threequarter point of the major axis of the ellipse within the reflectivity data.

10. The user device of claim 8, wherein the storage device stores further processor executable instructions which when executed causes the processor to transmit the updated estimate of the perimeter of the wildfire to a wildfire update website.

11. The user device of claim 8, wherein the processor executable instructions for generating the updated estimate of the perimeter of the wildfire comprise instructions which when executed cause the processor to:

add the plurality of fire points data to a wildfire point cloud representing the wildfire; and fit a polygon to the wildfire point cloud to generate the updated estimate of the perimeter of the wildfire.

12. The user device of claim 8, wherein the storage device stores further processor executable instructions, prior to the instructions for receiving the user defined polygon data, which when executed cause the processor to display, on a touchscreen, a wildfire graphical user interface (GUI).

13. A system for providing timely and accurate estimates of the location and rate-of spread of a wildfire comprising:

at least one weather radar;

a user device operably connected to the at least one weather radar; and a wildfire update website server operably connected to the user device; wherein the user device comprises a processor operably connected to an input device, an output device, a communication device and a storage device, and wherein the storage device comprises stores processor executable instructions which when executed cause the processor to:

receive, via the input device, user defined polygon data estimating a perimeter of a wildfire;

generate ellipse data fitting the polygon data;

receive, via the communication device, radar reflectivity data from the at least one weather radar;

determine, based on the radar reflectivity data and the ellipse data, local maxima data and a plurality of fire points;

generate an updated estimate of the perimeter of the wildfire based on the plurality of fire points;

displaying the updated estimate of the perimeter of the wildfire on a screen or printing the updated estimate of the perimeter of the wildfire on a printer.

14. The system of claim 13, further comprising a network operably connected between the at least one weather radar, the user device and the wildfire update website server.

15. The system of claim 13, wherein the storage device of the user device stores further processor executable instructions which when executed, after the processor executable instructions for generating the ellipse data, cause the processor to:

identify, based on the ellipse data, a center point, a quarter-point and a three quarter point of a major axis of an ellipse defined by the ellipse data; and wherein the storage device stores further processor executable instructions which when executed cause the processor to determine the local maxima data by searching radially outwardly from the center point, the quarter-point and the threequarter point of the major axis of the ellipse within the reflectivity data.

16. The system of claim 13, wherein the storage device of the user device stores further processor executable instructions which when executed causes the processor to transmit the updated estimate of the perimeter of the wildfire to the wildfire update website.

17. The system of claim 13, wherein the processor executable instructions for generating the updated estimate of the perimeter of the wildfire comprise instructions which when executed cause the processor to:

add the plurality of fire points data to a wildfire point cloud representing the wildfire; and fit a polygon to the wildfire point cloud to generate the updated estimate of the perimeter of the wildfire.

18. The system of claim 13, wherein the storage device stores further processor executable instructions, prior to the instructions for receiving the user defined polygon data, which when executed cause the processor to display, on a touchscreen of the user device, a wildfire graphical user interface (GUI).

19. The system of claim 13, wherein the at least one weather radar comprises a fixed weather radar.

20. The system of claim 13, wherein the updated estimate of the perimeter of the wildfire is printed on a printer.

* * * * *